US012701157B2

(12) United States Patent
Mo et al.

(10) Patent No.: US 12,701,157 B2
(45) Date of Patent: Aug. 4, 2026

(54) INFORMATION PROCESSING METHOD, COMPUTER DEVICE AND STORAGE MEDIUM

(71) Applicant: Beijing Volcano Engine Technology Co., Ltd., Beijing (CN)

(72) Inventors: Shilin Mo, Beijing (CN); Fan Yang, Beijing (CN); Jinhua Tan, Singapore (SG); Wenlong Luo, Beijing (CN); Yang Zhang, Beijing (CN); Jiajun Yuan, Beijing (CN); Jun Zhang, Beijing (CN); Zhening Zhang, Los Angeles, CA (US)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 92 days.

(21) Appl. No.: 18/732,422

(22) Filed: Jun. 3, 2024

(65) Prior Publication Data

US 2025/0023942 A1     Jan. 16, 2025

(30) Foreign Application Priority Data

Jul. 10, 2023     (CN) .......................... 202310842034.4

(51) Int. Cl.
*G06F 15/173* (2006.01)
*H04L 67/1004* (2022.01)

(52) U.S. Cl.
CPC ................................. *H04L 67/1004* (2013.01)

(58) Field of Classification Search
None
See application file for complete search history.

(56) References Cited

U.S. PATENT DOCUMENTS

2021/0117242 A1     4/2021     Van De Groenendaal et al.
2021/0243247 A1     8/2021     He et al.
2022/0109733 A1*    4/2022     Zhang ................... H04L 67/148

FOREIGN PATENT DOCUMENTS

CN          115525533 A          12/2022
CN          113382077 B           5/2023
CN          116048538 A           5/2023

OTHER PUBLICATIONS

Office action received from Chinese patent application No. 202310842034.4 mailed on Jul. 7, 2025, 19 pages (10 pages English Translation and 9 pages Original Copy).

(Continued)

*Primary Examiner* — Umar Cheema
*Assistant Examiner* — Andrew Woo

(57) ABSTRACT

An information processing method, a computer device, and a storage medium are provided. The method includes: acquiring communication information to be processed; extracting a key information character of the communication information to be processed by using a programmable hardware unit of a data processor; and according to the key information character, determining whether there is matching target processing operation information in a generated character mapping table, a character mapping table is generated by the programmable software unit of the data processor according to historical key information characters of historical communication information and their corresponding historical processing operation information, and the target processing operation information includes at least one micro-service processing operation; if yes, executing the micro-service processing operation included in the target processing operation information for the communication information to be processed.

12 Claims, 8 Drawing Sheets

Before unloading the micro-service governance logic to the DPU

After unloading the micro-service governance logic to the DPU

(56)                    References Cited

OTHER PUBLICATIONS

Communication pursuant to Rule 69 EPC for European Application
No. 24179048.4, mailed Jan. 20, 2025, 2 pages.
Extended European Search Report for European Application No.
24179048.4, mailed Nov. 27, 2024, 11 pages.

\* cited by examiner

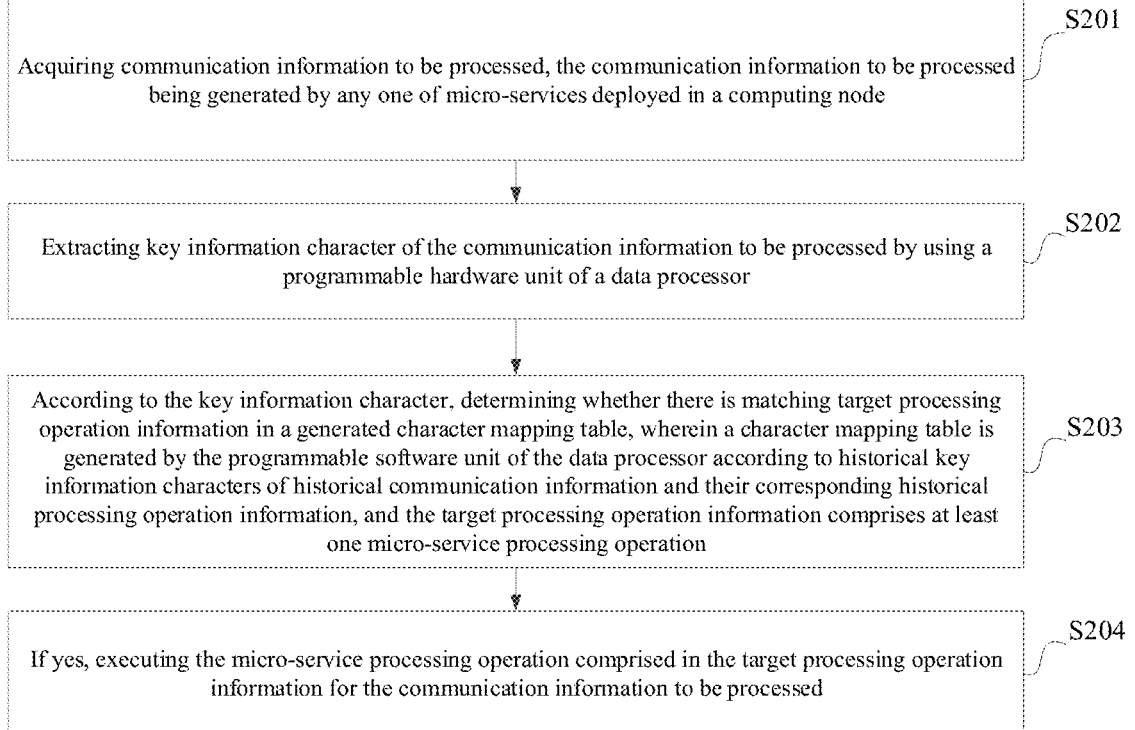

S201

Acquiring communication information to be processed, the communication information to be processed being generated by any one of micro-services deployed in a computing node

S202

Extracting key information character of the communication information to be processed by using a programmable hardware unit of a data processor

S203

According to the key information character, determining whether there is matching target processing operation information in a generated character mapping table, wherein a character mapping table is generated by the programmable software unit of the data processor according to historical key information characters of historical communication information and their corresponding historical processing operation information, and the target processing operation information comprises at least one micro-service processing operation

S204

If yes, executing the micro-service processing operation comprised in the target processing operation information for the communication information to be processed

FIG. 2

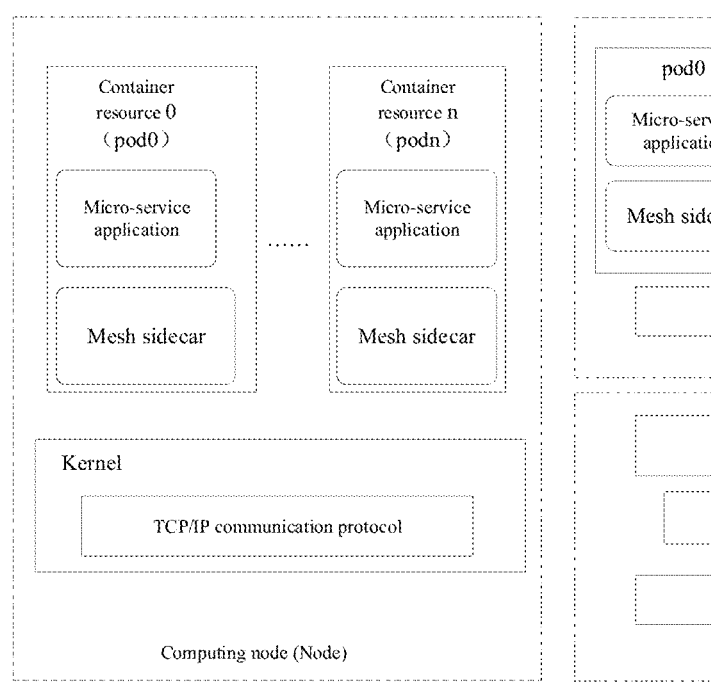
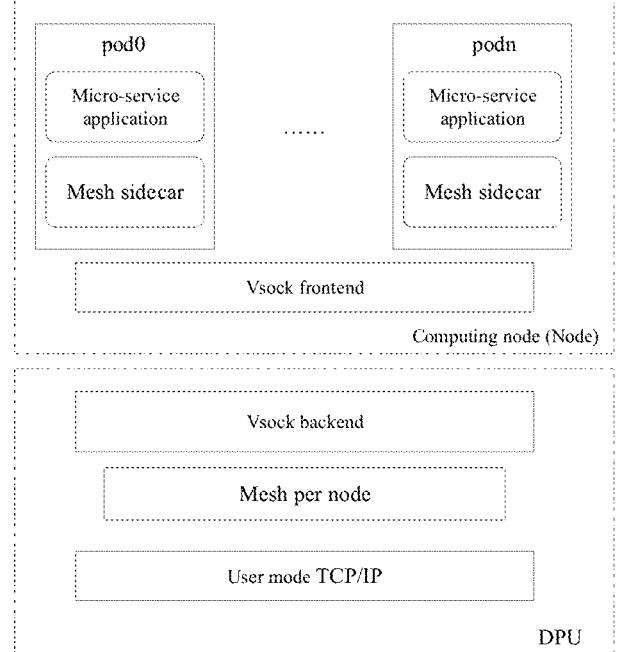
Before unloading the micro-service governance logic to the DPU
After unloading the micro-service governance logic to the DPU
FIG. 4
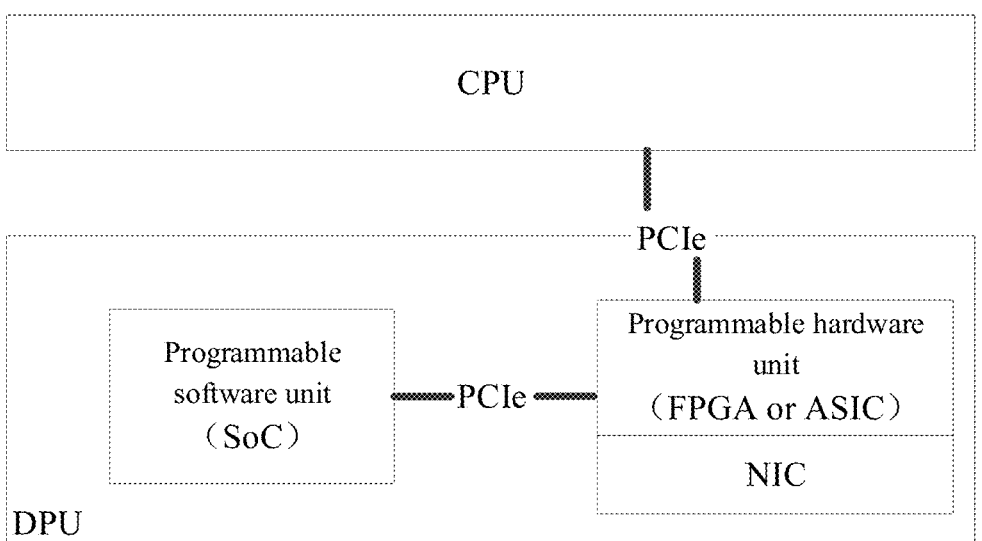
FIG. 5

Computer device                                    / 1202

Memory

/ 1201              Internal memory
                                                   1221

Processor             External memory
                                                   1222

Bus 1203

INFORMATION PROCESSING METHOD, COMPUTER DEVICE AND STORAGE MEDIUM

CROSS-REFERENCE TO RELATED APPLICATION(S)

This application claims the priority to and benefits of the Chinese Patent Application, No. 202310842034.4, which was filed on Jul. 10, 2023, which is hereby incorporated by reference in its entirety.

TECHNICAL FIELD

The present disclosure relates to the field of computer technology, specifically, an information processing method, an apparatus, a computer device and a storage medium.

BACKGROUND

In micro-services architectures, there are usually multiple micro-services applications deployed, and communication between different micro-services applications often requires "micro-services governance logic" to achieve. For example, the main functions of micro-services governance include service discovery, load balancing, routing, speed limiting, etc. Most of current micro-services architectures use the micro-services "Service Mesh" mode to deploy, and the core is to separate the "micro-service governance logic" from each micro-service application, and use a sidecar of the micro-service application as a proxy for the function of the "micro-service governance logic". In this way, each micro-service application corresponds to its own sidecar, thereby forming a Service Mesh.

However, in the Service Mesh deployment mode, the sidecars in the Service mesh have the problem of competing for resources with service processes corresponding to micro-services applications (e.g. operating system (OS), central processing unit (CPU), memory, cache, etc.), which affects the service performance of micro-services applications and increases the deployment cost of micro-services architecture.

SUMMARY

Embodiments of the present disclosure at least provides an information processing method, an apparatus, a computer device and a storage medium.

In first aspect, embodiments of the present disclosure provide an information processing method, wherein the information processing method is applied to a data processor and comprising:

acquiring communication information to be processed, the communication information to be processed being generated by any one of micro-services deployed in a computing node;

extracting key information character of the communication information to be processed by using a programmable hardware unit of a data processor; and according to the key information character, determining whether there is matching target processing operation information in a generated character mapping table, wherein a character mapping table is generated by the programmable software unit of the data processor according to historical key information characters of historical communication information and their corresponding historical processing operation information, and the target processing operation information comprises at least one micro-service processing operation;

if yes, executing the micro-service processing operation comprised in the target processing operation information for the communication information to be processed.

In an exemplary implementation, the micro-service processing operation comprises at least one verification processing operation with verification information, and the target processing operation information further comprises target verification information corresponding to a verification processing operation;

after executing the micro-service processing operation comprised in the target processing operation information, the method further comprises:

forwarding the communication information to be processed, in a case where first operation results corresponding to various verification processing operations each match the target verification information corresponding to the verification processing operation.

In an exemplary implementation, the micro-service processing operation comprises a load balancing processing operation; the target processing operation information further comprises at least one resource cluster to be selected and a target load balancing algorithm corresponding to the load balancing processing operation; the resource cluster to be selected comprises at least one resource container, and each resource container is deployed with a micro-service;

executing the micro-service processing operation comprised in the target processing operation information, comprises:

performing the load balancing operation on at least one resource cluster to be selected to acquire a target resource container by using the target load balancing algorithm;

after acquiring the target resource container, the method further comprises:

forwarding the communication information to be processed to a target micro-service deployed in the target resource container, so that the target micro-service responds to the communication information to be processed.

In an exemplary implementation, the micro-service processing operation comprises at least one of an information modification operation and a status recording operation;

executing the micro-service processing operation comprised in the target processing operation information for the communication information to be processed, comprises:

executing the information modification operation for the communication information to be processed to acquire modified communication information to be processed; and/or, performing the state recording operation for the communication information to be processed to acquire state recording information related to the communication information to be processed;

after executing the micro-service processing operation comprised in the target processing operation information, the method further comprises:

forwarding the modified communication information to be processed; and/or, storing the state record information.

In an exemplary implementation, the method further comprises:

in a case where the target processing operation information is absent, acquiring preset configuration information that matches the key information character according to the key information character by using the programmable software unit;

according to the preset configuration information, determining and executing a target processing operation that matches the communication information to be processed from multiple preset processing operations;

according to the target processing operation and the key information character, updating the character mapping table.

In an exemplary implementation, in a case where each preset processing operation comprises at least one preset verification processing operation, the determining and executing a target processing operation that matches the communication information to be processed from multiple preset processing operations according to the preset configuration information, comprises:

according to the preset configuration information, determining each target processing operation that need to be executed from each preset verification processing operation;

according to the key information character, acquiring preset verification information corresponding to each target processing operation; and, executing each target processing operation, and forward the communication information to be processed in a case where a second operation result of each target processing operation matches corresponding preset verification information;

the according to the target processing operation and the key information characters, updating the character mapping table, comprises:

associating and storing the key information characters, each target processing operation, and the preset verification information corresponding to the target processing operation in the character mapping table.

In an exemplary implementation, in a case where the preset processing operation comprises a preset information routing operation and a preset load balancing processing operation, the determining and executing a target processing operation that matches the communication information to be processed from multiple preset processing operations, comprises:

in response to the preset information routing operation and according to the key information character, acquiring at least one matching resource cluster that matches the key information character from each preset resource cluster comprised in the preset routing table, the preset resource cluster comprises at least one resource container, and each resource container is deployed with a micro-service;

in response to the preset load balancing processing operation, searching for a matching load balancing algorithm that matches the key information character, and determining a matching resource container from at least one matching resource cluster by using the matching load balancing algorithm;

taking the preset load balancing processing operation as the target processing operation, and forwarding the communication information to be processed to the micro-service deployed in the matching resource container;

the according to the target processing operation and the key information character, updating the character mapping table, comprises:

associating and storing the target processing operation, the matching load balancing algorithm, and the matching resource cluster in the character mapping table.

In an exemplary implementation, the extracting key information character of the communication information to be processed by using the programmable hardware unit of the data processor, comprises:

decoding and processing the communication information to be processed to acquire the decoded communication information to be processed by using the programmable hardware unit of the data processor;

extracting the key information character from the decoded communication information to be processed;

the forwarding the communication information to be processed to a target micro-service deployed in the target resource container, comprises:

according to a preset communication protocol between micro-services, encoding the decoded communication information to be processed, and forwarding the encoded information to the target micro-service deployed in the target resource container.

In second aspect, embodiments of the present disclosure provide an information processing apparatus, wherein the information processing apparatus is applied to a data processor and comprising:

an acquiring module, configured for acquiring communication information to be processed. The communication information to be processed is generated by any one of micro-services deployed in a computing node;

an extracting module, configured for extracting a key information character of the communication information to be processed by using a programmable hardware unit of a data processor;

a determining module, configured for determining whether there is matching target processing operation information in a generated character mapping table according to the key information character, the character mapping table being generated by the programmable software unit of the data processor according to a historical key information character of historical communication information and its corresponding historical processing operation information; the target processing operation information including at least one micro-service processing operation;

an executing module, configured for, if yes, executing a micro-service processing operation included in the target processing operation information for the communication information to be processed.

In third aspect, embodiments of the present disclosure further provide a computer device, which comprises: a processor, and a memory, wherein the memory stores machine readable instructions that is executed by the processor, the processor is used to execute the machine-readable instructions stored on the memory, and wherein in a case where the machine-readable instructions are executed by the processor, the processor executes the first aspect, or steps in any one of exemplary implementations.

In fourth aspect, embodiments of the present disclosure further provide a computer-readable storage medium, wherein a computer program is stored on the computer-readable storage medium, in a case where the computer program is run by a computer device, the computer device executes the first aspect, or steps in any one of exemplary implementations.

For the description of the effects of the above-mentioned information processing apparatus, computer device, and computer-readable storage media, please refers to the description of the above information processing methods, which will not be repeated here.

The information processing method, the apparatus, the computer device, and the storage medium provided in the embodiments of the present disclosure utilize a Data Processing Unit (DPU) to perform micro-service processing operations on communication information to be processed between micro-services, thus the Service Mesh can be offloaded to the DPU to implement micro-service governance logic by using the DPU, thereby achieving physical isolation between sidecars in the mesh and micro-services, avoiding resource competition between sidecars in the mesh and corresponding service processes in micro-services, improving the service performance of micro-service applications, and reducing the deployment cost of micro-service architecture. At the same time, when micro-service processing operations are performed, the generated character mapping table is used to determine whether to use programmable hardware units to perform micro-service processing operations or use programmable software units to perform micro-service processing operations. This can be achieved by using a combination of software and hardware to offload Service Mesh to the DPU. In this way, the advantages of programmable hardware units and programmable software units can be fully utilized to achieve proxies for micro-service governance logic and improve the performance of micro-service governance. Moreover, the target processing operation information in the character mapping table can be used to characterize the micro-service governance logic. In a case where there is matching target processing operation information presented in the character mapping table, the step of determining the micro-service governance logic that needs to be used can be saved by directly executing micro-service processing operations included in the target processing operation information by using programmable hardware units, thereby improving the speed of micro-service governance, reducing resource consumption and system costs of micro-service architecture.

In order to make the above objectives, characters, and advantages of the present disclosure more obvious and understandable, the following context provides preferred embodiments, and together with the attached drawings, provides a detailed explanation as follows.

BRIEF DESCRIPTION OF DRAWINGS

In order to provide a clearer explanation of the technical solution of the embodiments of the present disclosure, a brief introduction will be given below for the accompanying drawings required in the embodiments. The accompanying drawings are incorporated into the specification and form a part of the specification. These drawings illustrate embodiments that comply with the present disclosure and are used together with the specification to illustrate the technical solution of the present disclosure. It should be understood that the following drawings only illustrate certain embodiments of the present disclosure, and therefore should not be regarded as limiting the scope. For those skilled in the art, other relevant drawings can be acquired based on these drawings without creative labor.

FIG. 2 illustrates a flowchart of an information processing method provided in an embodiment of the present disclosure;

FIG. 4 illustrates a comparison diagram of micro-services governance logic before and after offloading to a DPU provided in an embodiment of the present disclosure;

FIG. 5 illustrates a schematic diagram of an architecture of a data processor provided in an embodiment of the present disclosure;

DETAILED DESCRIPTION

In order to make the purpose, technical solutions and advantages of embodiments of the present disclosure clearer, a clear and complete description of the technical solution in the embodiments of the present disclosure is provided in conjunction with the accompanying illustrations in the following. Obviously, the described embodiments are only part of the present disclosure, not the entire embodiments. Usually, the components in the embodiments of the present disclosures described and shown here can be arranged or designed in a variety of different configurations. Accordingly, the following detailed description of the embodiments of the present disclosure is not intended to limit the scope of the present disclosure seeks to protect, but only to indicate some selected embodiments in the present disclosure. Based on the embodiments of the present disclosure, all other embodiments acquired by those skilled in the art without creative labor fall within the protection scope of the present disclosure.

In addition, the term "first" or "second" in the description, claims and accompany drawings in the embodiments of the present disclosures is used to distinguish similar objects, and but isn't to describe a particular order or sequence. It should be understood that the terms used in this way are interchangeable in an appropriate situation, so that the embodiments described here can be implemented in other orders except for what has been shown or described here.

In the present context, "multiple" or "several" refers to two or more. "And/or" describes the relation between the associated objects, which indicates that there can be three kinds of relations. For example, A and/or B can be used to represent having, only A, both A and B, and only B. The character "/" generally indicates that the associated objects are in an "or" relation.

Figure 1:
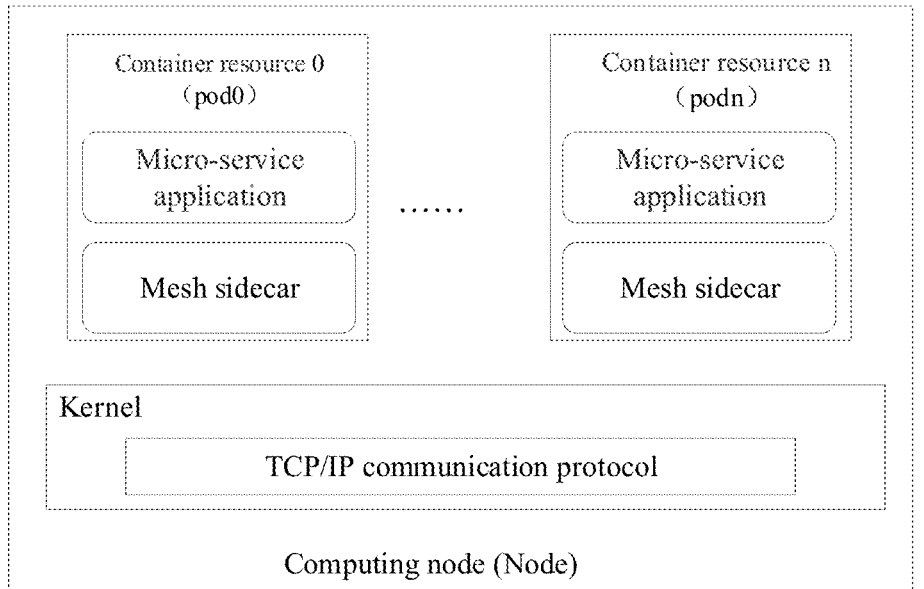
FIG. 1 illustrates a simplified mesh deployment diagram provided in an embodiment of the present disclosure.

Some researchers found that, in the early stages of the application of micro-services architecture, "micro-services governance logic" is often packaged in the form of an SDK as part of a micro-services application for use. In the later stages, in order to achieve the independence between micro-services applications and "micro-services governance logic", micro-services applications and "micro-services governance logic" are deployed in the Service Mesh model, and the sidecar container is used to agent each micro-services application corresponding to "micro-services governance logic". Different micro-services applications and their corresponding sidecar containers are deployed in the same container resource 0 (pod0), multiple pods can be deployed in the same computing node. One computing node can be understood as one computer device; micro-services in different pods use the TCP/IP communication protocol in the kernel to achieve the communication. As shown in FIG. 1, a simplified mesh deployment diagram is provided for the embodiments of the present disclosure. FIG. 1 includes n pods (i.e. pod0~podn, wherein, only pod0 and podn are shown, the rest of the pods are not shown), n is any positive integer, each pod includes one micro-service application and a mesh sidecar corresponding to the one micro-service application. The mesh sidecar, configured for agent the "micro-service governance logic", different micro-service governance logics correspond to different micro-service governance operations. N pods are deployed in the same computing node, and different pods communicate through TCP/IP protocol stack of the kernel state.

However, the current sidecar deployment model has the following two problems: 1) micro-services applications and mesh sidecars share pod resources, some pod resources are used by mesh sidecars, resulting in less resources available to micro-services applications, micro-services applications cannot exclusively use pod resources, thus there is a problem of micro-services applications and mesh sidecars competing for pod resources (such as OS, CPU, cache, and cache bandwidth, etc.), which affects micro-services applications, increases the deployment cost of micro-services architecture. 2) Due to micro-services applications and mesh sidecars sharing pod resources, resources available to micro-services applications is less, so the deployment density of micro-services in the node is reduced.

In order to achieve exclusively using of pod resources by micro-services applications. A deployment way called Cilium Service Mesh is proposed. In the deployment way, a mesh is deployed in each node (also referred as "Per Node", i.e. deploying a mesh in the Node to serve all micro-services applications on the Node). However, although this way guarantees that micro-services applications can share pod resources, the mesh and micro-services applications are still located in the same Node, so it is still impossible to avoid the problem of mesh and micro-services applications competing for resources in Node (e.g. CPU, OS, etc.) and reducing the deployment density of micro-services applications in Node. In addition, the Cilium Service Mesh way, with the use of eBPF in the kernel to implement the sidecar function, will also cause the problem of too much intrusion into the kernel. Thus, it is known that the Cilium Service Mesh method still has many disadvantages. Thus, how to solve the above two problems has also become a technical difficulty.

Based on the above research, the present disclosure provides a way to use a data processing unit (DPU) to perform a micro-service processing operation for the communication information to be processed between micro-services. It can offload the Service Mesh to the DPU in order to use the DPU to implement micro-service governance logic. Physical isolation between the sidecar in the mesh and the micro-service is achieved, the resource competition between the sidecar in the mesh and the service process corresponding to the micro-service is avoided, the service performance of the micro-service application is improved, and the deployment cost of the micro-service architecture is reduced. At the same time, in a case where the micro-services processing operations are performed, by determining whether to use programmable hardware units to perform micro-service processing operations or programmable software units to perform micro-service processing operations through the generated character mapping table, it can offload the Service Mesh to the DPU in a combination of software and hardware way. In this way, it can take full advantage of programmable hardware units and programmable software units, so as to implement the proxy for the micro-service governance logic and improve the performance of the micro-service governance. Further, the target processing operation information in the character mapping table can be used to represent the micro-service governance logic. In the case of matching target processing operation information exists in the character mapping table, by using the programmable hardware unit to directly execute the micro-service processing operation included in the target processing operation information, it can save steps in determining the micro-service governance logic to be used, improve the speed of micro-service governance, and reduce resource consumption and the system cost of the micro-service architecture. In addition, since the mesh is offloaded to the DPU, the resources in each node Per Node (e.g. OS, CPU, memory, etc.) can be used exclusively by the micro-services, thus improving the deployment density of micro-services applications in the Node.

The disadvantages of the above solutions are all the results of the inventor's practice and careful study. Thus, the discovery process of the above problems and the solutions proposed in the present disclosure for the above problems in the following context should be the contributions made by the inventor to the present disclosure process.

It should be noted that similar labels and letters represent similar terms in the following figures. Thus, once a term is defined in one figure, it does not need to be further defined or explained in subsequent figures.

It can be understood that before using the technical solutions disclosed in various embodiments of the present disclosure, users should be informed of the types of personal information, the usage scope, or the usage scenarios, etc., which are involved in the present disclosure in an appropriate way according to relevant laws or regulations and should be authorized by the users.

It should be noted that the specific nouns mentioned in the embodiment of the present disclosure include:

Remote Procedure Call, abbreviated as RPC, is a communication technology used by programs and processes running between multi-task operating systems or networked computers;

Mesh: A data plane used as a proxy for "micro-services governance logic";

Virtio-vsock: A zero configuration socket communication used for client host communication, where the host is the computing node that deploys micro-services;

Thrift: An interface description language and binary communication protocol used to define and create cross language services, typically used as a remote procedure call (RPC) framework;

QPS: Queries per second;

POC: In electronic models, POC stands for Proof of Concept, which stands for providing evidence for a viewpoint.

For the convenience of understanding the present embodiment, a detailed introduction to an information processing method disclosed in the embodiments of the present disclosure is provided firstly. The executing subject of the information processing method provided in the embodiments of the present disclosure is generally a terminal device or other processing device with certain computing capability, wherein the terminal device can be a User Equipment (UE), a mobile device, a user terminal, a terminal, a Personal Digital Assistant (PDA), a handheld device, a computer device, etc. In some exemplary implementations, the information processing method can be implemented by the processor invoking computer-readable instructions stored in memory.

Taking the execution subject as a computer device as an example, the information processing method provided in the embodiments of the present disclosure will be explained.

As shown in FIG. 2, a flowchart of an information processing method provided in an embodiment of the present disclosure includes the following steps:

S201: Acquiring communication information to be processed. The communication information to be processed is generated by any one of micro-services deployed in the computing node.

Here, the communication information to be processed can be RPC information received by the programmable hardware unit of the DPU, which can be represented as RxdMsg. The communication information to be processed usually carries a certain amount of information request, which is generated by any one of micro-services deployed in the computing node. After performing a series of micro-service governance operations on the communication information to be processed by using a data processor, it can be forwarded to other micro-services for processing.

Figure 3:
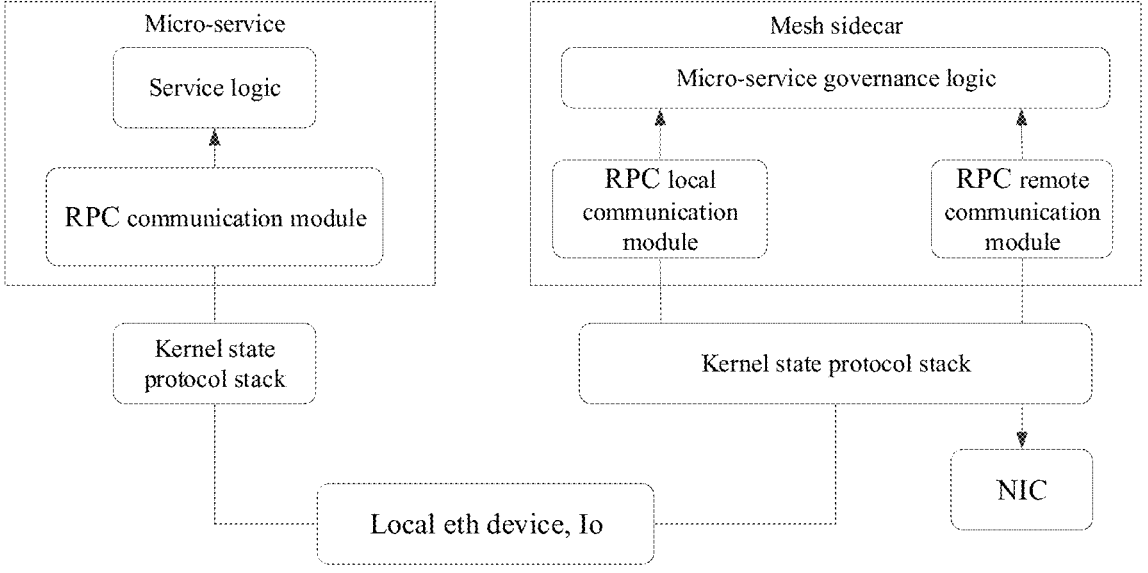
FIG. 3 illustrates a schematic diagram of a traditional micro-service communication provided in an embodiment of the present disclosure.

One computing node is one computer device, and at least one micro-service is deployed in one computing node, one micro-service can be understood as one micro-service application For the convenience of understanding the embodiments of the present disclosure, the following will firstly explain the micro-service communication method in the traditional Service Mesh mode. As shown in FIG. 3, a schematic diagram of a traditional micro-service communication is provided in an embodiment of the present disclosure. Herein, one micro-service includes two parts: one is a service logic corresponding to the micro-service, the other one is the remote procedure call communication module (i.e. RPC communication module). The service logic corresponding to micro-service refers to all the logic related to the service corresponding to micro-service. The kernel state protocol stack is the kernel TCP/IP protocol stack, which is used to indicate communication protocols. Io stands for local eth device, which is a local communication device. NIC network cards are used for communication between different micro-services. The mesh sidecar includes micro-service governance logic (which includes one or more micro-service processing operations), RPC local communication module, and RPC remote communication module. The RPC local communication module can communicate with micro-service through local eth dev, and the RPC remote communication module can communicate with the remote mesh sidecar through a network card (NIC). Based on the various parts in FIG. 3, local communication between micro-service and mesh sidecars can be achieved, as well as communication between different micro-services by using mesh sidecars. For example, after generating RxdMsg in micro-service, RxdMsg can be sent to mesh sidecars through local communication. After processing RxdMsg by using mesh sidecars, the processed RxdMsg can be sent to the mesh sidecars of other micro-services through NIC. Then, the mesh sidecars of other micro-services can utilize the corresponding local communication to send RxdMsg to that micro-service for processing.

In the information processing method provided in the embodiments of the present disclosure, it can offload the micro-service governance logic to the DPU. As shown in FIG. 4, a comparison diagram of the micro-services governance logic before and after offloading to a digital processor (DPU) provided in an embodiment of the present disclosure is provided. Herein, the drawing on the left of FIG. 4 is same as FIG. 1, and the drawing on the right of FIG. 4 is the mesh deployment diagram after offloading the micro-services governance logic to the DPU. There are the following differences between the two drawings in FIG. 4: 1. The deployment point is different, and the deployment point of the mesh changes from pod in Node to DPU; 2. The deployment mode is different, changing from sidecar mode to PerNode mode. 3. The communication between micro-services and mesh is different. In sidecar mode deployment, the communication between micro-services and mesh sidecars is implemented within the pod through Io or shared memory. After offloading on the DPU, micro-services communicate with mesh PerNode in target mode. For example, the target mode can be the virtio-vsock method way. 4. The communication between meshes is different. In sidecar mode deployment, communication is carried out through the kernel mode protocol stack. After offloading to the DPU, communication is carried out through the higher performing user mode TCP/IP protocol stack.

Exemplarily, after offloading the mesh to the DPU and after any one of micro-services generates the communication information to be processed, the corresponding pod of the micro-service can use the vsock front end in the computing node to communicate with the vsock back end in the DPU, to send the communication information to be processed to the DPU. In this way, the DPU can receive communication information to be processed from micro-services.

S202: Extracting the key information character of the communication information to be processed by using the programmable hardware unit of the data processor.

Here, the key information character is used to identify the key fields in the communication information to be processed, which can be represented by the msgkey. Different key information character can be configured with different micro-service governance logics. For example, key information characters can identify the source Internet Data Center (IDC), target IDC, the name of the source service, the cluster environment and other information of the communication information to be processed.

Data processors can be used to share complex calculations in the CPU, for example, they can be used to offload hypervisors for virtualization scenarios, such as to offload virtual storage, virtual networks, and related tasks. The architecture of a data processor mainly includes three parts, as shown in FIG. 5, one part is a programmable hardware unit, such as a Field Programmable Gate Array (FPGA) or an Application Specific Integrated Circuit (ASIC); one part is a programmable software unit, such as a System on Chip (SoC); the other part is a network card NIC (NIC). The high-speed serial computer interconnect express (PCIe, Peripheral Component Interconnect express) can be used inside the DPU and between the DPU and the CPU for communication.

Considering that the programmable hardware unit in the DPU has the character of high performance but complex programming, while the programmable software unit has the character of flexible programming but low performance, it is known that the programmable hardware unit is suitable for operations that are logically simple but performance sensitive (i.e. high performance requirements), and the programmable software unit is suitable for operations that are logically complex but performance insensitive (i.e. low performance requirements). The mesh can be offloaded to the DPU in the following three ways.

Way 1, the mesh is offloaded to the programmable software unit of the DPU; Way 2, the mesh is offloaded to the programmable hardware unit of the DPU; Way 3, the mesh is offloaded to the DPU in the soft-hard combination way, one part of which is offloaded to the programmable software unit and the other part to the programmable hardware unit.

For Way 1, it is equivalent to using the programmable software unit of the DPU to replace the CPU in the Node, which is only a cost transfer, and the high cost-effectiveness is a problem; for Way 2, due to the complexity of programming in the programmable hardware unit, it is difficult to completely offload the mesh to the programmable hardware unit, so both Way 1 and Way 2 cannot implement the offloading problem of the mesh very well. Thus, embodiments of the present disclosure provide a software-hardware combination way to offload the mesh, in which the architecture of the mesh is modified and the characters suitable for different parts of the DPU are used, thus ensuring the performance of the mesh while offloading the mesh to the DPU.

For example, the micro-service governance process contained in the mesh can be divided into two types of paths. The first type of path is a path implemented by using the programmable software unit, which, configured for perform a micro-service governance on the communication information to be processed according to the preset configuration information that corresponds to the key information character, in a case wherein the key information character does not exist in the character mapping table. Herein, micro-service governance refers to "determining each target processing operation that needs to be executed for the communication information to be processed from the preset micro-service governance operations, and executing the determined target processing operation for the communication information to be processed". At the same time, after performing each target processing operation, according to each target processing operation, the target processing operation information corresponding to the key information character is generated and stored to the character mapping table. The communication information to be processed in the first type of path is the communication information to be processed whose corresponding key information character doesn't have corresponding target processing operation information in the latest generated character mapping table. In other words, the key information character corresponding to each communication information to be processed by the first type of path is the first-time extracted key information character, and the first type of path can be used to update the character mapping table. Due to the fact that the first type of path requires "firstly determining the target processing operation to be executed before executing", the first type of path often has complex execution logic. Accordingly, in a case where using the first type of path to perform micro-service governance for processing communication information, the time period of the governance is often not considered, whereas the focus is on completing micro-service governance for processing communication information regardless of execution time. Thus, the first type of path can also be called a slow path (slowpath).

The second type of path is a path implemented by using the programmable hardware unit, which, configured for perform the micro-services governance on the communication information to be processed corresponding to the key information character that exists in the character mapping table. That is, the key information character corresponding to the communication information to be processed by the second type of path is the non-first-time extracted key information character. The second type of path can directly perform micro-service governance on the communication information to be processed, according to target processing information stored in the character mapping table and matched with the key information character during execution. There is no step of determining whether each preset micro-service governance operation needs to be executed, and the target processing operation information can be directly used to acquire the micro-service processing operations that need to be executed. Due to the fact that the second type of path can directly utilize target processing operation information for micro-service governance, the second type of path often has simpler execution logic compared to the first type of path. Due to the simple execution logic, in a case where using the second type of path to execute micro-service governance for processing communication information, the focus is on the time period of the governance, the governance speed and efficiency. Thus, the second type of path can also be called a fast path (fastpath).

The second type of path can be used to execute S201 to S203. If the judgment result is yes, continue to use the second type of path to execute S204; otherwise, enter the first type of path. That is to say, you can first enter the second type of path, the programmable hardware unit can be used to acquire any communication information to be processed in the second type path and execute steps S202 and S203 according to the second type path. Based on the judgment result in step S203, determining whether to continue using the second type of path to execute step S204, or to enter the first type of path, so as to execute micro-service governance for communication information to be processed by using the programmable software unit according to the first type of path.

Exemplarily, the mesh can be modified into two parts: slowpath and fastpath. Slowpath is a logically complex but performance insensitive part that is implemented by programmable software units after the modification. Fastpath is a logically simple but performance sensitive part that is implemented by programmable hardware units after the modification. In the specific implementation of S202 mentioned above, in a case where the DPU determines that it needs to receive the communication information to be processed, it can first go through the fastpath and use programmable hardware units to receive the communication information to be processed. Then, programmable hardware units can be used to parse the communication information to be processed, and to extract the key information character corresponding to the communication information to be processed.

S203: According to the key information character, determining whether there is matching target processing operation information in the generated character mapping table. The character mapping table is generated by the programmable software unit of the data processor according to the historical key information characters of historical communication information and their corresponding historical processing operation information. The target processing operation information includes at least one micro-service processing operation.

Here, the character mapping table stores each extracted key information character, as well as the processing operation information corresponding to the key information character. The processing operation information can include at least one micro-service processing operation related to that key information character. For example, the character mapping table can store data using a key-value pair structure, wherein, the key is the individual extracted key information character and the value is the processing operation information corresponding to the key information character (using the action list to identify), in which at least one micro-service processing operation that needs to be performed is included.

The character mapping table can be generated using programmable software unit according to slowpath, for example, using historical key information characters that is extracted in history and the historical processing operation information associated with that historical key information character. Exemplarily, historical key information characters can be the key information characters corresponding to the received historical communication information before receiving the currently being processed communication information. Historical processing operation information refers to the processing operation information determined based on the characteristics of historical key information. The steps for generating the character mapping table will be explained in detail in the following context.

For examples of S203, after extracting the key information character, a programmable hardware unit can be used to find the currently generated character mapping table, and to determine whether there is processing operation information in the character mapping table that matches the key information character. If yes, then use the processing operation information as the target processing operation information, and perform the following S204. If not, then indicate that historical communication information with the key information character was not received before extracting the key information character, the communication information with the key information character was acquired for the first time. Thus, it is necessary to use a programmable software unit to process the communication information to be processed through slowpath. Moreover, the processing results of the slowpath and the key information characters of the communication information to be processed can be utilized to update the character mapping table, so that in a case where new communication information with this key information character is received in the future, the processing operation information in the character mapping table can be directly used for processing. The steps to update the character mapping table using the processing results of slowpath will be explained in detail in the following context.

S204: If yes, then performing the micro-service processing operation including the target processing operation information for the communication information to be processed.

For example, in a case where the target processing operation information is found from the latest character mapping table, the fastpath can be continued, and various micro-service processing operations indicated by the target processing operation information can be executed using programmable hardware units for processing communication information to be processed.

Furthermore, after executing various micro-service processing operations included in the target processing operation information, if all micro-service processing operations are completed and the execution results meet the requirements, that is, if the communication information to be processed conforms to the corresponding micro-service governance logic, the communication information to be processed can be forwarded to the target micro-service for response. Otherwise, the communication information to be processed can be deleted.

In one embodiment, micro-service processing operations can be of multiple types, each type can include one or more kinds of processing operations. Exemplary, multiple types of micro-service processing operations can include four kinds: a verification processing operation with validation information, a load balancing processing operation for determining target micro-services and an information routing operation, an information modification operation for modifying communication information to be processed and a status recording operation for recording relevant information of communication information to be processed. Some of the types can further include various processing operations. For example, the verification processing operation can include an information authentication operation, an information speed limit operation, etc. The information modification operation can include a modification operation with function A and a modification operation with function B, etc. The key information characters are different, so the corresponding type and quantities of micro-service processing operations can be different, different types of micro-service processing operations have different functions.

In the case where the micro-service processing operation indicated by the target processing operation information includes at least one verification processing operation with validation information, the target processing operation information further includes the target verification information corresponding to the verification processing operation. The target verification information is used to verify the communication information to be processed, in order to determine whether the communication information needs to be forwarded.

In the case where the micro-service processing operation includes at least one verification processing operation, after executing S204 above, the following steps can be further performed:

Forwarding communication information to be processed in a case where the first operation result corresponding to each of verification processing operations matches the target verification information corresponding to the verification processing operations.

Here, the first operation result is the operation result acquired after performing the verification processing operation on the communication information to be processed. One verification processing operation corresponds to one first operation result.

For example, for any verification processing operation, after acquiring the first operation result corresponding to the verification processing operation, the target verification information corresponding to the verification processing operation can be used to verify the first operation result. In the case that the verification fails, the communication information to be processed can be discarded directly. In the case the verification passes, it can be determined whether there are any other verification processing operations that have not been executed. If so, continue to perform other verification processing operations and verify based on the acquired first operation result, until the verification fails or all the first operation results corresponding to various verification processing operations are verified and passed, and the communication information to be processed can be forwarded.

Herein, when forwarding communication information to be processed, if the communication information to be processed carries the target micro-service, the mesh communication module can be directly used to send the communication information to be processed to the target micro-service through the user mode TCP/IP protocol stack and NIC. Thus, utilizing fastpath to achieve mesh communication with the target micro-service.

Exemplarily, in a case where the verification processing operation includes information speed limit operation and information authentication operation, the target verification information included in the target processing operation information can be the target authentication information and target speed limit value, and the target authentication information can be an access control table, where authentication information is stored. The target speed limit value is used to represent the maximum information transmission rate.

For S204, the current information transmission rate of the communication information to be processed can be calculated, herein, the current information transmission rate is the first operation result corresponding to the information speed limit operation. When the current information transmission rate is less than or equal to the target speed limit value, it can be determined that the communication information to be processed can pass the speed limit verification. Then, the authority information of the communication information to be processed (such as token information, etc.) can be acquired, where the authority information is the first operation result corresponding to the information authentication operation. Then, in a case where the authority information matches the target authentication information, it can be determined that the communication information to be processed can pass authentication verification. Afterwards, if there are other types of micro-service processing operations, the communication information to be processed can be sent to the target micro-service after completing the other types of micro-service processing operations. If there are no other types of micro-service processing operations, and the target micro-service is carried in the communication information to be processed, the communication information to be processed can be forwarded to the target micro-service.

Conversely, if the current information transmission rate is greater than the target speed limit, or, if the authority information does not match the target authentication information, it can indicate that the communication information to be processed cannot pass the verification, and the communication information to be processed can be discarded.

In one embodiment, the micro-service processing operation indicated by the target processing operation information may further include a load balancing processing operation. The target processing operation information further includes at least one resource cluster to be selected corresponding to the load balancing operation and the target load balancing algorithm. The resource cluster to be selected includes at least one resource container, and each resource container is deployed with micro-services. In the case where the micro-service processing operation include the load balancing operation, for S204 mentioned above, the target load balancing algorithm can be used to perform load balancing operations on at least one resource cluster to be selected to acquire the target resource container.

Here, the resource container may be a pod resource container, and the resource cluster to be selected includes at least one pod resource container. Each pod resource container may have micro-services deployed, and each pod resource container can be deployed on at least one computing node. If the resource cluster to be selected is acquired from the character mapping table, the same micro-services can be deployed in each pod resource container included in the resource cluster to be selected.

The load balancing processing algorithm is used to select one target resource container from multiple resource containers included in the resource cluster to be selected to receive the current communication information to be processed.

Exemplarily, in a case where the load balancing processing operations, the resource cluster to be selected, and the target load balancing algorithm are acquired from the character mapping table by utilizing key information characters, the target load balancing algorithm can be used to select the target resource container from multiple resource containers included in the resource cluster to be selected. After acquiring the target resource container, the communication information to be processed can also be forwarded to the target micro-service deployed in the target resource container to make the target micro-service respond to the communication information to be processed.

Here, the target micro-service is the micro-service deployed in the target resource container. After determining the target resource container, the mesh communication module can be used to send the communication information to be processed to the target micro-service via the user mode TCP/IP protocol stack and NIC. In this way, the mesh communication with the target microservice is realized by using the fastpath.

Optionally, the micro-service processing operation indicated by the target processing operation information may include at least one verification processing operation and a load balancing processing operation. For example, micro-service processing operations indicated by target processing operation information may include an information speed limit operation, an information authentication operation, and a load balancing processing operation. At the same time, the target processing operation information may further include a target speed limit value, target authentication information, as well as a resource cluster to be selected and a target load balancing algorithm. For example, the target processing operation information is: action1=information speed limit, metadata=target speed limit value; action2=information authentication, metadata=target authentication information; action3=load balancing, metadata 1=resource cluster to be selected, metadata2=target load balancing algorithm. In this case, for S204, the information speed limit operation for processing communication information can be executed firstly to acquire the current information transmission rate. In a case where the current information transmission rate is less than or equal to the target speed limit, the information authentication operation for processing communication information is performed to acquire the authority information. In a case where the authority information matches the target authentication information, the target load balancing algorithm is used to select the target resource container from multiple resource containers included in the resource cluster to be selected. Finally, the communication information to be processed can be forwarded to the target micro-service in the target resource container.

If the current information transmission rate is greater than the target speed limit or the authority information does not match the target authentication information, the communication information to be processed can be directly deleted.

In one embodiment, for S202, the following steps can also be implemented as follow steps:

S202-1: decoding and processing the communication information to be processed by using the programmable hardware unit of the data processor, to acquire the decoded communication information to be processed.

Here, since the received communication information to be processed may be encoded data, it is necessary to decode the communication information by using the programmable hardware unit to acquire the decoded communication information after receiving it.

S202-2: extracting a key information character from the decoded communication information to be processed.

Exemplarily, after acquiring the decoded communication information to be processed, an existing character extraction algorithm can be used to extract the key information character from the decoded communication information.

Further, for the step of "forwarding the communication information to be processed to the target micro-service deployed in the target resource container", the decoded communication information to be processed can be encoded based on the preset communication protocol between micro-services, and the encoded information can be forwarded to the target micro-service deployed in the target resource container.

Here, the preset communication protocol can be the TCP/IP protocol indicated by the user mode TCP/IP protocol stack. In order to ensure that the decoded communication information can be successfully transmitted and that the target micro-service can recognize the received information, the mesh communication module in the DPU can be used to encode the decoded communication information according to the user mode TCP/IP protocol to acquire the encoded information. Then, the encoded information can be forwarded to the mesh communication module corresponding to the target micro-service deployed in the target resource container, and the pod resource container corresponding to the target micro-service can acquire the encoded information through the mesh communication module and the front and back ends of the virtio-vsock. Subsequently, the target micro-service can acquire the encoded information and parse and respond to it.

It is understood that for the decoded communication information to be processed acquired from S204, the communication information to be processed in S204, are all decoded communication information to be processed.

In one embodiment, the micro-service processing operation indicated by the target processing operation information may further include an information modification operation and/or a status recording operation. In this case, for S204 mentioned above, the following steps can also be implemented:

Performing the information modification operation on the communication information to be processed to acquire the modified communication information to be processed; and/or, perform a status recording operation to acquire status recording information related to the communication information to be processed.

For example, for the communication information to be processed, in a case where using key information characters to search for information modification operations and status record operations from the character mapping table, specific information modification operations can be performed to acquire the modified communication information to be processed. For example, information modification operations include adding fields, deleting fields, or modifying fields in the communication information to be processed.

At the same time, during the process of modifying information, status recording operations can be performed to acquire status recording information related to the communication information to be processed. It can be understood that, if the micro-service processing operation indicated by the target processing operation information only includes the status recording operation, it can further perform the status recording operation for the communication information to be processed and record various information related to the communication information to be processed when receiving the communication information to be processed in the DPU. For example, recording logs, counting the total number of received communication information to be processed, and counting the number of communication information under various key information characters.

Furthermore, after performing information modification operations and/or status recording operations for the communication information to be processed, the modified communication information to be processed can further be forwarded, and/or status recording information can be stored.

Exemplarily, after performing information modification operations, the modified communication information to be processed can be forwarded to the target micro-service. Herein, the target micro-service can be the micro-service carried by the communication information to be processed or the micro-service in the target resource container determined by the target load balancing algorithm. After performing the status recording operation, the status recording information can be stored on the control panel.

It can be understood that, as an example, the micro-service processing operations indicated by the target processing operation information may include at least one of a verification processing operation, a load balancing processing operation, an information modification operation, and a status recording operation, which is not specifically limited in embodiments of the present disclosure; for example, it can be determined based on the micro-service governance logic corresponding to key information characters. For example, the target processing operation information can be: action1=information speed limit, metadata=target speed limit value; action2=information authentication, metadata=target authentication information; action3=information modification, metadata=field1; action4=status recording, metadata=all; action5=load balancing, metadata1=resource cluster to be selected, metadata2=target load balancing algorithm. In this case, for S204, the action1 can be executed first, and after passing the verification, the action2 can be executed. If the action 2 passes the verification, the action 3 is executed to acquire the modified communication information to be processed, and the action 4 is executed to acquire status record information. Then, the action 5 is executed to acquire the target resource container. Finally, the modified communication information to be processed can be forwarded to the target micro-service in the target resource container, and the status record information can be stored on the control panel.

In one embodiment, if it is impossible to find matching target processing operation information from the generated character mapping table by using key information characters, it can be explained that the communication information with the key information character is the first acquired communication information. Thus, a notification module needs to be used to notify the programmable software unit to process the communication information to be processed and update the character mapping table through slowpath. For example, the communication information to be processed may be processed and the character mapping table may be updated according to the following steps:

S1: In the absence of target processing operation information, acquiring preset configuration information that matches the key information characters by using the programmable software unit.

Here, the preset configuration information can be the configuration information corresponding to various key information characters pre-issued by the control panel, which is used to determine the micro-service governance operations that need to be executed. Different preset configuration information matches different key information characters.

For example, in the absence of target processing operation information, it can be determined that it is necessary to enter the slowpath. Thus, the notification module set in the DPU can be used to notify the programmable software unit to enter the slowpath. Then, by using the programmable software unit, acquiring preset configuration information that matches the decoded communication information to be processed based on the msgkey of the decoded communication information to be processed.

S2: according to the preset configuration information, determining and executing the target processing operation that matches the communication information to be processed from multiple preset processing operations.

Here, the target processing operation is the micro-service governance operation that matches the decoded communication information to be processed. The preset processing operation may include at least one of various verification processing operations with verification information, load balancing processing operations, information routing operations, information modification operations, and status recording operations. It should be noted that the embodiments of the present disclosure do not limit specific preset processing operations, but various micro-service governance operations related to micro-service governance logic can be used as preset processing operations in the embodiments of the present disclosure. For example, common micro-service governance operations can have functions such as service discovery, load balancing, health check, dynamic routing, current limiting, speed limiting, and meltdown functions.

For example, the programmable software unit can be used to sequentially determine the target processing operations that need to be executed from the preset processing operations according to the preset configuration information, and execute the target processing operations to acquire the corresponding execution results of the target processing operations.

S3: updating the character mapping table, according to the target processing operations and the key information characters.

For example, after determining the target processing operation and its corresponding execution result (i.e. the second operation result in the following context), each target processing operation and its second operation result can be abstracted as processing operation information corresponding to key information characters. Herein, the processing operation information can be an action list, which includes various actions, namely the target processing operations. The metadata of each action can be determined based on the result of the second operation. For each target processing operation in the action list, in a case where new communication information to be processed is acquired and the action list that serves as the target processing operation information is found using the fastpath, each target processing operation in the action list will be used as the micro-service processing operation that needs to be executed for the new communication information to be processed by the fastpath.

It is noted that in a case where target processing operations including load balancing processing operations and information routing operations, the load balancing processing operations and information routing operations can correspond to one action, herein, the corresponding action is the load balancing processing operation, the metadata corresponding to the load balancing processing operation is the resource cluster determined after the information routing operation, and the load balancing algorithm corresponding to the load balancing processing operation.

After acquiring the action list, key information characters can be used as keys in the character mapping table, and the action list can be used as values in the character mapping table to update the character mapping table. In this way, after receiving new communication information to be processed with the key information character, the action list can be directly acquired using the fastpath, and various actions in the action list can be executed using the programmable hardware unit to ultimately determine whether to discard the new communication information to be processed or forward it to the corresponding target micro-service.

At the same time, after performing the target processing operation, the decoded communication information to be processed can be encoded, the encoded information is acquired, and the encoded information can then be forwarded to the target micro-service for allowing the target micro-service to respond to the encoded information. Herein, the target micro-service can be the micro-service carried by the communication information to be processed or the micro-service in the target resource container determined by the target load balancing algorithm.

Figure 6:
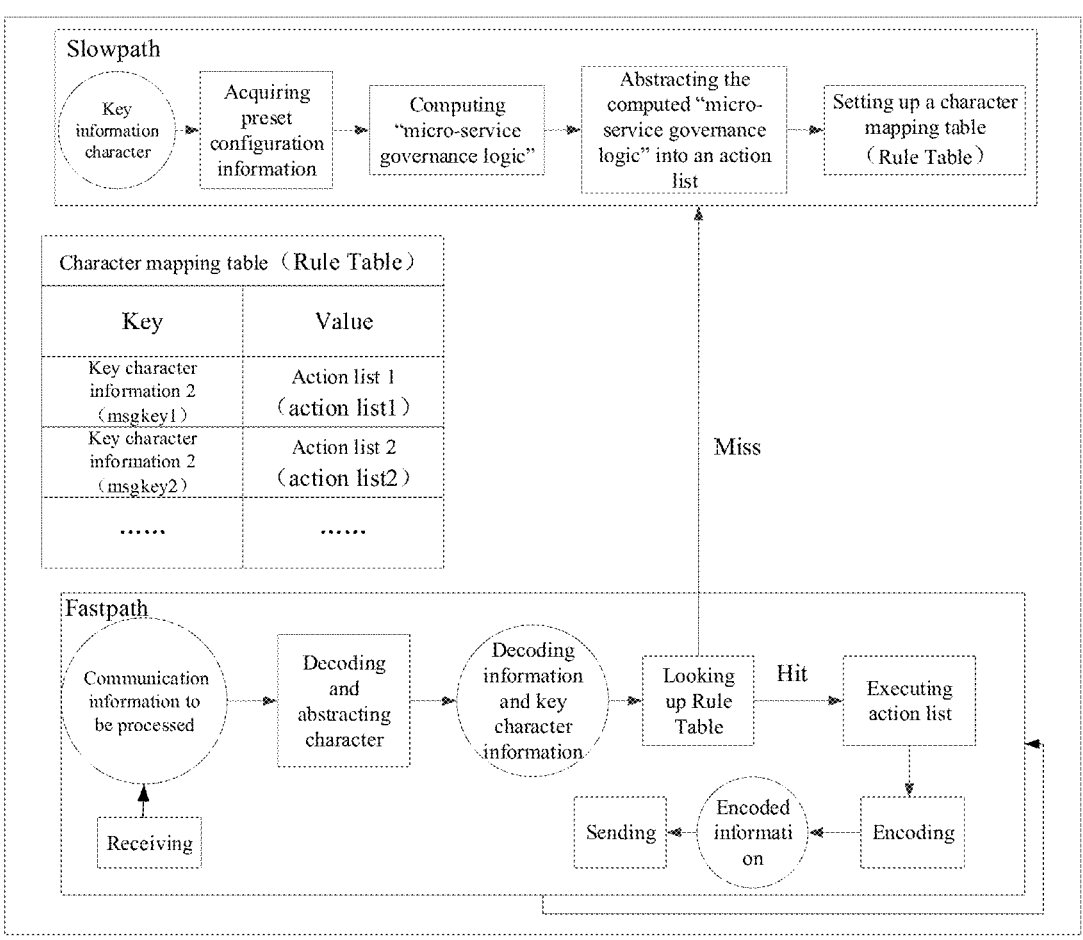
FIG. 6 illustrates a schematic diagram of a fastpath, a slowpath, and a character mapping table provided in an embodiment of the present disclosure.

As shown in FIG. 6, it is a schematic diagram of a fastpath, slowpath, and character mapping table provided in the embodiments of the present disclosure. Herein, the slowpath is executed by a programmable software unit in the DPU, and the fastpath is executed by a programmable hardware unit in the DPU. The fastpath first receives the communication information to be processed (i.e. RxdMsg), decodes and extracts characters, which is the process of decoding the communication information to acquire the decoded communication information (abbreviated as the decoded information, i.e. DecodedMsg), and extracting key information characters (i.e. msgkey) from the decoded communication information to be processed. Then, looking up the Rule Table to determine if it hits (i.e., to determine if there is any matching target processing operation information). If it hits, various micro-service processing operations indicated in the action list corresponding to the target processing operation information can be executed; in the case of successful execution, the decoded communication information to be processed can be encoded to acquire the encoded information (i.e. TxdMsg). Finally, TxdMsg can be sent to the determined target micro-service. g). In the absence of target processing operation information, i.e. in a case where the missing occurs after looking up the Rule Table, entering the slowpath. For the slowpath, the preset configuration information can be acquired based on the key information character (msgkey), and then the "micro-service governance logic" can be calculated, that is, to execute the above S2, so as to acquire the target processing operation and the second operation result. Then, the calculated "micro-service governance logic" can be abstracted as an action list. Finally, the action list and msgkey can be used to set up a character mapping table (Rule Table), where msgkey is the key in the Rule Table and the action list is the value corresponding to that key. In the Rule Table in FIG. 6, it includes the key information character 1 (msgkey 1) and its corresponding action list 1 (action list 1), as well as the key information character 2 and its corresponding action list 2 (action list 2). Other msgkeys and corresponding action lists are not shown one by one in the Rule Table in FIG. 6 and are all represented by ellipsis.

Figure 7:
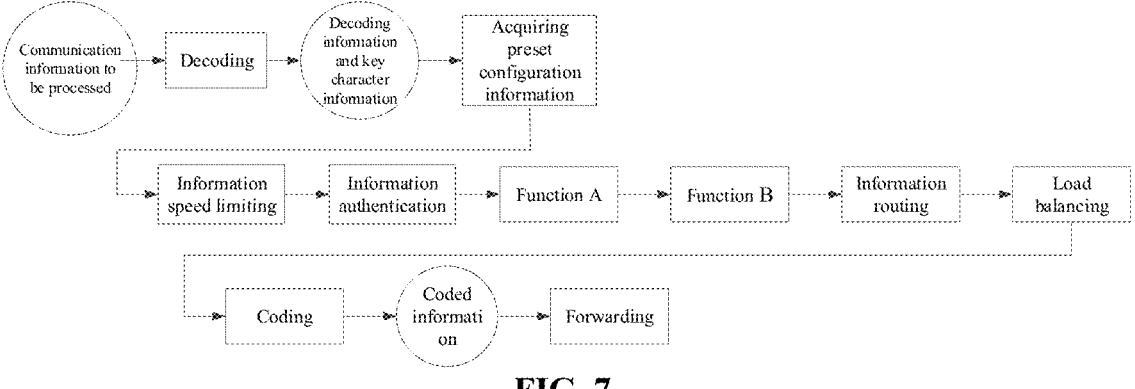
FIG. 7 illustrates a schematic diagram of an original micro-service governance process provided in an embodiment of the present disclosure.

For the convenience of understanding the information processing method provided in the embodiments of the present disclosure, the following will provide a detailed explanation of the original micro-service governance process in related technology and the process of micro-service governance using the information processing method provided in the embodiments of the present disclosure. The communication information to be processed acquired in both processes is the same. As shown in FIG. 7, it is a schematic diagram of an original micro-service governance process of an embodiment of the present disclosure, wherein the preset processing operation may include an information speed limiting operation, an information authentication operation, an operation with function A, an operation with function B, an information routing operation, and a load balancing processing operation.

The original micro-service governance process shown in FIG. 7 is used to explain the specific processing process for the communication information to be processed:

Step 1: receiving communication information to be processed (i.e. receiving RxdMsg).

Step 2: decoding and extracting a key information character. Herein, the decoded communication information to be processed is represented by DecodedMsg, and the extracted key information characters are called msgkey.

Step 3: acquiring preset configuration information according to the msgkey. Here, the preset configuration information corresponds to the execution of three operations: "information speed limit, information routing, and load balancing processing". For each extracted msgkey, the preset configuration information acquired is the same in a case where the msgkey is the same.

Step 4: Information speed limit operation: herein, the step 4 includes the following substeps 1-4:

Substep 1: according to the preset configuration information, determining whether the speed limit needs to be executed, and the result is required.

Substep 2: according to the msgkey, checking a speed limit table to acquire the target speed limit value.

Substep 3: calculating the current information transmission rate of the communication information to be processed with msgkey.

Substep 4: determining if there is an overspeed. There are two results, result 1: overspeed, discarding, and the processing is completed; result 2: no overspeed. Here, assuming the result is not overspeed, proceed to step 5 below.

Step 5: Information authentication operation: according to the preset configuration information, determining whether the authentication is required, and the result is that it is not required; executing step 6 below.

Step 6, Function A: according to the preset configuration information, determining whether to perform the operation corresponding to the function A, and the result is that it is not necessary; executing step 7 below.

Step 7, Function B: according to the preset configuration information, determining whether to perform the operation corresponding to the function B, and the result is that it is not necessary; executing step 8 below.

Step 8: Information routing operation: according to the msgkey, searching the target cluster (i.e. the matching resource cluster in the following context) used to process the communication information to be processed.

Step 9: Loading balancing processing operation: selecting an endpoint from the target cluster by using the preset load balancing algorithm, where endpoint is the target resource container.

Step 10: Encoding: encoding DecodedMsg to acquire encoded information, where the encoded information is represented by TxdMsg.

Step 11: Forwarding: sending TxdMsg to the endpoint selected in step 9.

In the original micro-service governance process, for each received communication information to be processed with the same msgkey, the above steps 1 to 11 are required to complete the governance of the communication information to be processed. However, in a case where the msgkeys are the same, the execution process is the same. As shown in steps 1 to 11 above, the preset configuration information, the target speed limit value, and the logic of not executing "the authentication operation, function A, and function B", and the routing destination (i.e. target cluster) are all the same and determined. Thus, these unchanged parts can be fixed or optimized, thereby greatly reducing the steps in the execution process and thus reducing complexity. Thus, the process of micro-service governance with "fast-slow separation" as shown in FIG. 6 in the embodiments of the present disclosure is proposed. For example, the mesh can be reconstructed into two parts: "fastpath" and "slowpath". For the slowpath, the semantics of "micro-service governance logic" can be implemented from a service level. The logic is complex but not sensitive to performance, making it suitable for achieving by programmable software units in DPUs. For the fastpath, the message can be operated by looking up the Rule Table and following the actions defined in the Rule Table. The logic is simple but performance sensitive, making it suitable for achieving by programmable hardware units in DPUs.

The following is a description of the process of micro-service governance with "fast-slow separation" as shown in FIG. 6. Herein, the specific processing of communication information to be processed is explained.

Step a: the fastpath receives the communication information to be processed RxdMsg.

Step b: the fastpath decodes and extracts characters. The decoded communication information to be processed is DecodedMsg, and the extracted key information characters are msgkey;

Step c: the fastpath looks up Rule Table based on the msgkey. Here, the results include two types: Result A: hit, which determines the existence of matching target processing operation information. Following steps d-1, e, and f are executed in sequence; Result B: miss, which means there is no matching target processing operation information. Steps d-2, g, h, i, j, k, and l are executed in sequence.

Step d-1, the fastpath executes the action list. Here, various micro-service governance operations included in the action list can be executed to acquire the results of each first operation.

Step e: the fastpath encodes DecodedMsg. Here, if the action list includes information modification operations, the fastpath performs encoding on the modified information to acquire the encoded information TxdMsg.

Step f: the fastpath sends TxdMsg; sending TxdMsg to the selected endpoint of the load balancing processing operation in the action list, with; alternatively, if the action list does not include load balancing processing operations, TxdMsg can be sent to the target micro-service carried by the communication information to be processed.

Step d-2: Miss; the fastpath sends the msgkey to slowpath. Here, the result of the first extracted msgkey is usually miss.

Step g: the slowpath retrieves preset configuration information based on the msgkey. Here, since the communication information to be processed acquired by the current process is consistent with the communication information to be processed acquired by the original micro-service governance process mentioned above, the msgkey is the same, and the preset configuration information acquired is also consistent. That is to say, the configuration content corresponding to the preset configuration information is to perform three operations: "information speed limit, information routing, and load balancing processing".

Step h: the slowpath compute the "micro-service governance logic", that is, executing S2 above to acquire the target processing operation and the second operation result.

Step i: the slowpath abstracts the computed "micro-service governance logic" as an action list.

Step j: the slowpath set Rule Table, that is, setting the character mapping table (Rule Table) by using action list and msgkey, herein, msgkey is the key in the Rule Table and action list is the value corresponding to that key.

Step k: Encoding: encoding DecodedMsg to acquire encoded information, herein, the encoded information is represented by TxdMsg. Here, if the target processing operation includes information modification the encoding is performed on the modified information to acquire the encoded information TxdMsg.

Step l: Forwarding; sending TxdMsg to the selected endpoint.

Based on the comparison of the above two processes, it can be seen that for a series of messages with the same characteristics (i.e. massages with the same msgkey), the slowpath determines and controls the service attributes of "micro-service governance", and the implementation logic is relatively complex. However, only the communication information to be processed corresponding to the first extracted msgkey needs to operate, which is not sensitive to performance. Fastpath can use the action list stored in the Rule Table to process messages; it does not have or care about the service attributes of micro-service governance logic, and the implementation logic is relatively simple. However, all subsequent messages that are processed have the msgkey already in the Rule Table, thus, it is sensitive to performance.

In one embodiment, in a case where the preset processing operation includes at least one preset verification processing operation, the following steps can be implemented for S2 as described above:

S2-1: according to the preset configuration information, determining each target processing operation that needs to be executed from various preset verification processing operations.

In this step, in the slowpath, the programmable software unit can be used to sequentially determine each verification processing operation that needs to be executed from various preset verification processing operations based on preset configuration information, and the determined verification processing operations can be used as the target processing operations.

S2-2: according to the key information character, acquiring preset verification information corresponding to each target processing operation.

Here, as the target processing operation is a verification processing operation, it is also necessary to acquire the corresponding preset validation information in order to verify the operation results.

At the same time of determining the target processing operation, the slowpath can further be used to execute the determined target processing operation to achieve governance of the communication information to be processed. For example, in a case where the target processing operation include an information speed limit operation and an information authentication operation, for the information speed limit operation, a target speed limit value that matches the key information character can be looked up from the preset speed limit table according to the key information character, and this speed limit value can be used as the preset verification information corresponding to the information speed limit operation. For the information authentication operation, the key information character can be utilized to look up an access control table, which can then be used as preset verification information. Alternatively, the matching authentication information that matches the key information character can be looked up from the access control table, and the matching authentication information can be used as the preset verification information corresponding to the information authentication operation.

S2-3: executing each target processing operation, and forwarding the communication information to be processed in a case where the second operation result of each target processing operation matches the corresponding preset verification information.

Here, the second operation result is the execution result acquired after executing the target processing operation on the communication information to be processed.

Exemplarily, in a case where the target processing operation includes an information speed limit operation and an information authentication operation, the information authentication operation can be performed on the decoded communication information to be processed to acquire the authority information (i.e. the second operation result corresponding to the information authentication operation) firstly. When the authority information matches the target authentication information, the speed limit operation can be performed on the decoded communication information to be processed to determine the current information transmission rate (i.e. the second operation result corresponding to the speed limit operation). When the current information transmission rate is less than or equal to the target speed limit value, it is determined that the second operation result of each target processing operation matches the corresponding preset verification information, and then the communication information to be processed can be forwarded. For example, the decoded communication information can be encoded to acquire the encoded information, which can then be forwarded to the target micro-service, so that the target micro-service can respond to the encode information. Alternatively, the undecoded communication information to be processed can also be directly forwarded to the target micro-service.

Furthermore, after determining the target processing operation and corresponding preset verification information, the character mapping table can also be updated using slowpath. For example, key information characters, various target processing operations, and the preset verification information corresponding to target processing operations can be associated and stored in the character mapping table.

For example, each target processing operation and the second operation result can be abstracted as processing operation information corresponding to key information characters. Herein, the processing operation information can be an action list, which includes various actions, namely the target processing operation. The metadata of each action can be determined according to the second operation result. For example, in a case where the target processing operation includes an information speed limit operation and an information authentication operation, the action list can include: action1=information speed limit, metadata=target speed limit value; action2=information authentication rights, metadata=target authentication information. After acquiring the action list, the key information character can be used as a key in the character mapping table, the action list as a value in the character mapping table, and then the character mapping table is updated.

In another embodiment, the preset processing operation can further include a preset information routing operation and a preset load balancing processing operation. In this case, for S2 mentioned above, the following steps can be implemented:

T1: in response to the preset information routing operation, according to the key information character, acquiring at least one matching resource cluster that matches the key information character from preset resource clusters included in the preset routing table. The preset resource cluster includes at least one resource container, each resource container is deployed with micro-service.

Here, the preset routing table stores multiple preset resource clusters, each of which includes at least one resource container. The resource container is the pod resource container, and the micro-service is deployed in each resource container. One preset resource cluster can correspond to one micro-service, that is, the micro-services deployed within various resource containers included in the same preset resource cluster can be the same. One micro-service can correspond to at least one preset resource cluster, that is, one micro-service can be deployed in resource containers corresponding to multiple preset resource clusters.

For each preset resource cluster, the individual resource containers in the preset resource cluster can be deployed in the same computing node or in different computing nodes.

Exemplarily, in a case where it is determined that the preset processing operation includes the preset routing operation, it can be determined whether the preset routing operation needs to be executed according to the preset configuration information. If yes, the preset routing operation is executed, and the preset routing table is looked up according to the key information character to determine at least one matching resource cluster from each preset resource cluster included in the routing table that matches the key information characters. If not, it can be determined whether to perform the preset load balancing processing operation according to the preset configuration information. If yes, execute T2 below and use the preset load balancing processing operation as the target processing operation. If not, ignore the preset load balancing and routing operations.

It should be noted that in general, in a case where preset processing operations including preset routing operations and preset load balancing processing operations, the preset configuration information will indicate that both operations need to be executed, and finally, only the preset load balancing processing operation can be used as the target processing operation.

T2: In response to the preset load balancing processing operation, search for a matching load balancing algorithm that matches the key information characters, and use the matching load balancing algorithm to determine the matching resource container from at least one matching resource cluster.

For example, in a case where determining that the preset processing operation includes the preset load balancing processing operation, a matching load balancing algorithm that matches the key information characters can be searched in response to the preset load balancing processing operation. Then, a matching load balancing algorithm can be used to perform load balancing on at least one matching resource cluster, in order to determine a matching resource container from the various resource containers included in at least one matching resource cluster.

T3: using the preset load balancing processing operation as the target processing operation, and forwarding the communication information to be processed to the micro-services deployed in the matching resource container.

Here, for different communication information to be processed, under the condition that the key information characters of each communication information to be processed are consistent, the matching resource clusters searched from the preset routing table are the same. Thus, in order to improve the efficiency of fastpath execution, in a case where the preset processing operations include preset information routing operations and preset load balancing processing operations, only the preset load balancing processing operation can be used as the target processing operation. At the same time, after determining the matching resource container, the decoded communication information can be encoded to acquire the encoded information, and the encoded information can be forwarded to the micro-services deployed in the matching resource container to enable the micro-services to respond to the encoded information.

Furthermore, after setting the preset load balancing processing operation as the target processing operation, the target processing operation, matching load balancing algorithm, and matching resource cluster can also be associated and stored in the character mapping table.

Exemplarily, the preset load balancing processing operation can be used as an action, and the matching load balancing algorithm and matching resource cluster can be used as the two metadata corresponding to the action. For example, action=preset load balancing processing operation, metadata1=match resource cluster, metadata2=match load balancing algorithm. Then, key information characters will be used as keys in the character mapping table, and the action and its corresponding metadata1 and metadata2 will be stored as values in the character mapping table.

Optionally, the preset processing operation may include at least one preset verification processing operation, a preset information routing operation and a preset load balancing processing operation. For example, the preset processing operation can include a preset information speed limit operation, a preset information authentication operation, a preset information routing operation, and a preset load balancing processing operation. Then, in the case of determining that the required operations include these four operations according to the preset configuration information, the preset information speed limit operation, preset information authentication operation, and preset load balancing processing operation can be used as target processing operations; and according to the target speed limit value corresponding to the preset information speed limit operation, the target authentication information corresponding to the preset information authentication operation, the matching resource cluster determined according to the preset information routing operation, the matching load balancing algorithm searched according to the key information character, and various target processing operations, an action list can be generated. Then, the character mapping table can be updated using the action list and key information characters.

In one implementation, the preset processing operation may further include a preset information modification operation and/or a preset status recording operation. In this case, it can be determined whether to perform the preset information modification operation according to the preset configuration information. If yes, the preset information modification operation is taken as the target processing operation and executed to acquire the second operation result; if not, ignoring the preset information modification operation.

And/or, according to the preset configuration information, determining whether to perform the preset state recording operation. If yes, setting the preset state recording operation as the target processing operation and executing it to acquire the second operation result; if not, ignoring the preset state recording operation.

When it is determined that the preset information modification operation and the preset state recording operation need to be executed, an action list can be generated according to the preset information modification operation and its corresponding second operation result, as well as the preset state recording operation and its corresponding second operation result. Then, the character mapping table can be updated using the action list and key information characters.

It can be understood that, as an example, the preset processing operation may include at least one of the preset verification processing operation, preset load balancing processing operation, preset information modification operation, and preset status recording operation, which is not limited in the embodiments of the present disclosure. Exemplarily, in a case where it is determined that the target processing operations to be executed from the preset processing operations according to the preset configuration information include preset verification processing operations, preset information modification operations, preset status recording operations, and preset load balancing processing operations, the generated processing operation information (i.e. the action list) can include action1=information speed limit, metadata=target speed limit value; action2=information authentication, metadata=target authentication information; action3=information modification, metadata=field1; action4=status record, metadata=all; action5=load balancing, metadata1=matching resource cluster, metadata2=matching load balancing algorithm. Then, the key information character can be used as key, and the processing operation information can be associated and stored in the character mapping table as the corresponding value, in order to update the character mapping table.

Thus, in a case where the fastpath misses the character mapping table, that is, in the absence of target processing operation information, using programmable software units according to the slowpath can not only achieve governance of communication information to be processed, but also achieve timely updating of the character mapping table.

In one embodiment, in order to further explain the difference between the original micro-service governance process in related technology and the process of micro-service governance by using the information processing method provided in the embodiments of the present disclosure, the specific processing process of processing communication information using the two processes will be specifically explained in the following.

Original micro-service governance process:

Step 1: receiving RxdMsg.

Step 2: decoding and extracting characters; wherein, the decoded communication information to be processed is represented by DecodedMsg, and the extracted key information characters are called msgkey.

Step 3: acquiring preset configuration information according to msgkey. Here, the configuration information corresponding to the preset configuration information are four operations: "information speed limit, information authentication, information routing, and load balancing processing". For each extracted msgkey, the preset configuration information acquired is consistent in a case where the msgkey is the same.

Step 4: Information speed limit operation; herein, step 4 includes the following substeps 1-4:

Substep 1, according to the preset configuration information, determining whether the speed limit needs to be executed; the result is yes.

Substep 2, according to the msgkey, checking the speed limit table to acquire the target speed limit value.

Substep 3, calculating the current information transmission rate of the communication information to be processed with msgkey.

Substep 4, determining if there is an overspeed. There are two results, result 1: overspeed, discarding, and the processing is completed; result 2: no overspeed. Here, assuming the result is not overspeed, proceed to step 5 below.

Step 5: Information authentication operation: herein, step 5 can include the following substeps 5-7.

Substep 5: determining whether the authentication is required according to the preset configuration information, and the result is yes.

Substep 6: extracting the authority information, that is, extracting token and other authority information from DecodedMsg.

Substep 7: looking up the access control table to determine if the authentication has passed, that is, determining whether the authority information is consistent with the target authentication information. There are two results, result 1: failed, discarding and the processing is completed; result 2: passed. Here, assuming the result is passed, proceed to step 6 below.

Step 6, Function A: according to the preset configuration information, determining whether to perform the operation corresponding to the function A, and the result is that it is not necessary; executing step 7 below.

Step 7, Function B: according to the preset configuration information, determining whether to perform the operation corresponding to the function B, and the result is that it is not necessary; executing step 8 below.

Step 8: Information routing operation: according to the msgkey, searching the target cluster (i.e. the matching resource cluster in the following context) used to process the communication information to be processed.

Step 9: Loading balancing processing operation: selecting an endpoint from the target cluster by using the preset load balancing algorithm, where endpoint is the target resource container.

Step 10: Encoding: encoding DecodedMsg to acquire encoded information, where the encoded information is represented by TxdMsg.

Step 11: Forwarding: sending TxdMsg to the endpoint selected in step 9.

Here, in the original micro-service governance process, for each received msgkey with the same communication information to be processed, going through steps 1 to 11 above is necessary.

Below, the flow of micro-service governance with "fast-slow separation" as shown in FIG. 6 is used to explain the specific processing of communication information to be processed:

Step a: the fastpath receives the communication information to be processed RxdMsg; assuming that the msgkey of RxdMsg is extracted for the first time;

Step b: the fastpath decodes and extracts characters. The decoded information to be processed is DecodedMsg, and the extracted key information characters are msgkey.

Step c: the fastpath looks up for Rule Table according to the msgkey. Here, because the msgkey of DecodedMsg is extracted for the first time, the look-up result is miss. Steps miss-1 to miss-7 are executed in sequence.

Step miss-1, sending the msgkey to slowpath for processing.

Step miss-2, the slowpath searches for the preset configuration information according to the msgkey. Here, the configuration content corresponding to the preset configuration information is to execute four operations: "information speed limit, information authentication, information routing, and load balancing processing".

Step miss-3, the slowpath computes the "micro-service governance logic", that is, executing the above S2 to acquire the target processing operation and the second operation result.

Step miss-4, the slowpath abstracts the computed "micro-service governance logic" as an action list; for example, it may include substeps a to e.

Substep a: looking up the speed limit table according to the msgkey, to acquire the target speed limit value, and computing the current information transmission rate of DecodedMsg to determine whether it is overspeed. There are two results, result 1: overspeed, discarding, and the processing is completed; result 2: no overspeed, executing substep b. Here, assuming the result is not overspeed, performing the following Substep b;

Substep b, extracting token and other authority information from DecodedMsg, and looking up the access control table to determine if the authentication is passed. There are two results, result 1: failed, discarding; the processing is completed; result 2: passed. Here, assuming the result is passed, performing the following substep c.

Substep c, looking up the routing table, according to the msgkey to acquire the target cluster (i.e. matching resource cluster).

substep d, determining the matching load balancing algorithm according to the msgkey, and using the load balancing algorithm to select an endpoint from the target cluster, wherein, the endpoint is the target resource container.

Substep e, action list is abstracted as:

action1=information speed limit, metadata=target speed limit value;

action2=information authentication, metadata=target authentication information;

action3=load balancing, metadata1=matching resource clusters, metadata2=matching load balancing algorithm.

Step miss-5, the slowpath sets the Rule Table, that is, using "Action Table configuration module" to update the Rule Table through the action list and the msgkey, wherein, the msgkey is the key in the Rule Table and the action list is the value corresponding to the key.

Step miss-6, Encoding; encoding DecodedMsg to acquire encoded information, wherein, the encoded information is represented by TxdMsg. Here, if the target processing operation includes the information modification operation, this encoding is performed on the modified information to acquire the encoded information TxdMsg.

Step miss-7, Forwarding; sending TxdMsg to the endpoint selected in substep d.

Step d, the fastpath continues to receive new communication message to be processed RxdMsg; assuming that the msgkey of RxdMsg is not extracted for the first time.

Step e: the fastpath decodes and extracts characters. The decoded information to be processed is DecodedMsg, and the extracted key information characters are msgkey.

Step f: the fastpath searches for the Rule Table according to the msgkey. Here, because the msgkey of DecodedMsg is not extracted for the first time, the searching result is hit. Steps hit-1 to hit-3 are executed in sequence;

Step-hit-1, the fastpath executes the action list. Here, assuming that the action list includes three actions (i.e. action1=information speed limit, metadata=target speed limit value; action2=information authentication, metadata=target authentication information; action3=load balancing, metadata1=matching resource cluster, metadata2=matching load balancing algorithm, which are abstracted from the above substep e), executing each action in sequence.

(1) "action1=Information speed limit, metadata=target speed limit value".

Calculating the current information transmission rate of DecodedMsg and determining if it is greater than the target speed limit value. There are two results, result 1: overspeed, discarding, and the processing is completed; result 2: no overspeed. Here, assuming the result is no overspeed, executing the following (2);

(2) "action2=Information authentication, metadata-target authentication information".

extracting the authority information such as tokens from DecodedMsg, and looking up access control tables to determine if the authentication is successful. There are two results, result 1: failed, discarding, and the processing is completed; result 2: passed. Here, assuming the result is passed, execute the following (3);

(3) "action3=load balancing, metadata 1=match resource cluster, metadata2=match load balancing algorithm".

According to the matching load balancing algorithm in metadata2, selecting an endpoint from the matching resource cluster in metadata1, wherein, the endpoint is the target resource container.

Step-hit2, the fastpath encodes DecodedMsg. Here, if the action list includes the information modification operation, the fastpath performs the encoding on the modified information to acquire the encoded information TxdMsg.

Step-hit3, the fastpath sends TxdMsg; sending TxdMsg to the selected endpoint (i.e. the endpoint selected in (3) in the load balancing processing operation of the action list above).

In this way, with regard to the micro-service governance process of "fast-slow separation", for communication information to be processed with the same msgkey, only the slowpath needs to process the communication information to be processed which extract the msgkey for the first time. For subsequent communication information to be processed which do not extract the msgkey for the first time, the fastpath will process it according to the action list stored in the Rule Table. Thus, the execution process of the fastpath is greatly simplified, and the processing speed of each communication information to be processed which do not extract the msgkey for the first time is increased.

Figure 8:
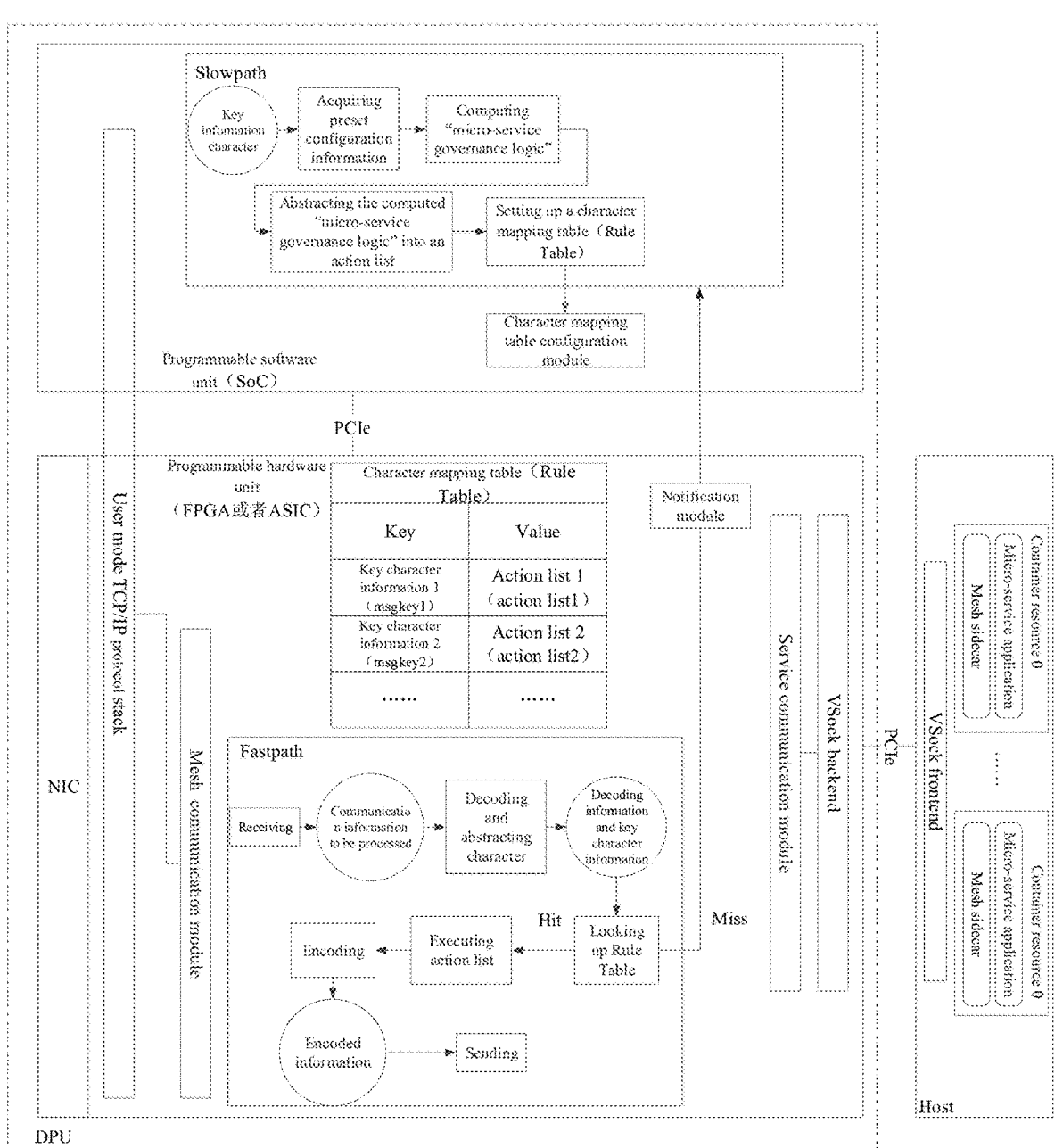
FIG. 8 illustrates a schematic diagram of an architecture of a DPU after reconstructing the mesh into "slowpath" and "fastpath" as provided in an embodiment of the present disclosure.

As shown in FIG. 8, it is a schematic diagram of the architecture of a DPU provided in the embodiments of the present disclosure after reconstructing the mesh into "slowpath" and "fastpath". Herein, FIG. 8 includes three parts: a programmable software unit (SoC), a programmable hardware unit, and a host. The programmable hardware unit and the programmable software unit form a DPU. The communication between the programmable hardware unit and the programmable software unit, as well as between the programmable hardware unit and the host, can be implemented according to the PCIe standard.

Herein, the programmable software unit (SoC) includes a slowpath module and a character mapping table configuration module (Rule Table configuration module). The slowpath module is used to execute the slowpath and implement the mesh slowpath function through only the software. The Rule Table configuration module is used to read and write Rule Tables. The slowpath module can configure Rule Tables through the Rule Table configuration module.

The programmable hardware unit (FPGA or ASIC) includes a Rule Table, a fastpath module, a notification module, a vsock back-end, a service communication module, a user mode TCP/IP protocol stack, a mesh communication module, and a network card NIC. Herein, the Rule Table (i.e. character mapping table) can be located in the in-chip storage or out-chip storage of programmable hardware units. The fastpath module is used to execute the fastpath and implement the mesh fastpath function through only the hardware. The notification module is used to notify the slowpath in a case where the fastpath module searches for Rule Table and the result is miss. The vsock back-end is used to communicate with the vsock front-end on the host to complete front-end and back-end communication functions. The service communication module is used to receive and send information from Pod through the vsock back-end, thereby achieving the receiving/sending function of service communication in fastpath. User mode TCP/IP protocol stack, which is a user mode TCP/IP protocol stack implemented by integrating SoC and programmable hardware units together in software and hardware. The mesh communication module is used to receive and send information from the network card NIC through the user mode TCP/IP protocol stack, thereby achieving the receiving/sending function of fastpath and peer mesh communication.

The host can be a computing node, which includes a deployed micro-service and a vsock front-end, wherein, the micro-services are for applications deployed in the pod. The vsock front-end, configured for communicating with the vsock back-end on the DPU to complete the front-end communication function.

Based on the DPU architecture shown in FIG. 8, it can achieve the process of micro-service governance in a fast-slow separation way.

In one embodiment, in order to facilitate the understanding of the micro-service governance process of "fast-slow separation" provided in an embodiment of the present disclosure, the overall process of the micro-service governance process of "fast-slow separation" will be introduced in conjunction with the DPU architecture shown in FIG. 8.

Step 1: the fastpath receives a communication information to be processed RxdMsg; assuming that the msgkey of the RxdMsg is extracted for the first time, it can be received by the "mesh communication module" or "service communication module".

Step 2: the fastpath decodes and extracts characters. The decoded information to be processed is DecodedMsg, and the extracted key information character is msgkey.

Step 3: the fastpath searches for Rule Table according to msgkey. Here, because the msgkey of DecodedMsg is extracted for the first time, the searching result is miss, and then the msgkey can be sent to the slowpath on SoC for processing through the "notification module" (slowpath can execute miss step 1 to miss step 7, sequentially).

Miss-step1, the slowpath searches for the preset configuration information according to the msgkey. Here, it is assumed that the configuration content corresponding to the preset configuration information is to perform three operations: "information speed limit, information routing, and load balancing processing".

Miss-step2, the slowpath computes the "micro-service governance logic", that is, executes the above S2 to acquire the target processing operation and the second operation result.

Miss-step3, the slowpath abstracts the computed "micro-service governance logic" as an action list; Miss-step3 can specifically include miss-step3-1 to miss-step3-4.

Miss-step3-1, acquiring the target speed limit value by looking up the speed limit table according to the msgkey, and calculating the current information transmission rate of DecodedMsg to determine whether it is overspeed. There are two results, result 1: overspeed, discarding, and the processing is completed; result 2: no overspeed, executing sub-step b. Here, assuming the result is no overspeed, execute the following miss-step3-2.

Miss-step3-2, looking up the routing table according to the msgkey to acquire the target cluster (i.e. the matching resource cluster).

Miss-step3-3, determining the matching load balancing algorithm according to the msgkey, selecting an endpoint from the target cluster by using the load balancing algorithm, wherein, the endpoint is the target resource container.

Miss-step3-4, the action list is abstracted as:
action1=information speed limit, metadata=target speed limit value;
action2=load balancing, metadata 1=target cluster, metadata2=matching load balancing algorithm;

Miss-step4, the slowpath sets the Rule Table, that is, through the "Rule Table Configuration Module", updates the Rule Table using the action list and msgkey, where msgkey is the key in the Rule Table, and the action list (abstracted from Miss-step3-4) is the value corresponding to that key.

Miss-step5, encoding; encoding DecodedMsg to acquire encoded information, wherein the encoded information is represented by TxdMsg. Here, if the target processing operation includes information modification operation, the encoding is performed on the modified information to acquire the encoded information TxdMsg.

Miss-step6, forwarding; sending TxdMsg to the endpoint selected in miss step3-3.

Step 4: the fastpath continues to receive new communication messages RxdMsg to be processed; assuming that the msgkey of the RxdMsg is not extracted for the first time, for example, the RxdMsg can be received through the "mesh communication module" or "service communication module".

Step 5: the fastpath decodes and extracts characters. The decoded information to be processed is DecodedMsg, and the extracted key information characters are msgkey.

Step 6: the fastpath looks up the Rule Table according to msgkey. Here, because the msgkey of DecodedMsg is not extracted for the first time, the look-up result is hit, and the steps from Step-hit-1 to Step-hit-3 are executed sequentially.

Step-hit-1, the fastpath executes the action list. Here, assuming that the action list includes two actions (i.e. action1=information speed limit, metadata=target speed limit value, action2=load balancing, metadata1=target cluster, metadata2=matching load balancing algorithm, which are abstracted in above miss-step-3-4), execute each action in sequence.

(i) "action1=information speed limit, metadata=target speed limit value".

calculating the current information transmission rate of DecodedMsg and determining if it is greater than the target speed limit value. There are two results, result 1: overspeed, discarding, and the processing is completed; result 2: no overspeed. Here, assuming the result is no overspeed, execute the following (ii).

(ii) "action2=load balancing, metadata1=target cluster, metadata2=matching load balancing algorithm".

According to the matching load balancing algorithm in metadata2, selecting an endpoint from the target cluster in metadata1, the endpoint is the target resource container.

Step-hit-2, the fastpath encodes DecodedMsg. Here, if the action list includes the information modification operation, the fastpath performs encoding on the modified information to acquire the encoded information TxdMsg.

Step-hit-3, the fastpath sends TxdMsg; sending TxdMsg to the selected endpoint (i.e. the endpoint selected in above (ii)) in the load balancing processing operation of the action list.

Herein, step-miss 1 to step-miss 6 are all operations performed on the programmable software unit (SoC) of the DPU, while steps 1 to 3, 4 to 6, and step-hit 1 to step-hit-3 are all operations performed on the programmable hardware unit of the DPU.

In this way, not only the mesh data panel can be offloaded using a combination of software and hardware by DPU, but micro-service governance can also be achieved through a "fast-slow separation" architecture (slowpath implements "micro-service governance logic" semantics at the service level; fastpath operates on communication information to be processed at the processing level). In addition, it uses the Rule Table to express micro-service governance logic, abstracts the processing process of micro-service governance logic as an action list of operation messages. The action list consists of a series of actions, which can usually be divided into the following four types: Type 1, actions that modify the content of a message (i.e. communication information to be processed): such as adding one field to a message, deleting one field, modifying one field, etc. Type 2, actions that determine whether the forwarding conditions are met: such as whether it is overspeed and whether the access permission is met. Type 3, forwarding actions: actions that calculate the forwarding destination (i.e. the endpoint) or reject; Type 4, Status Recording Action: actions that record statistics or other related information. By abstracting the various types of actions mentioned above into an action list, the efficiency of micro-service processing can be effectively increased.

Figures 9, 10:
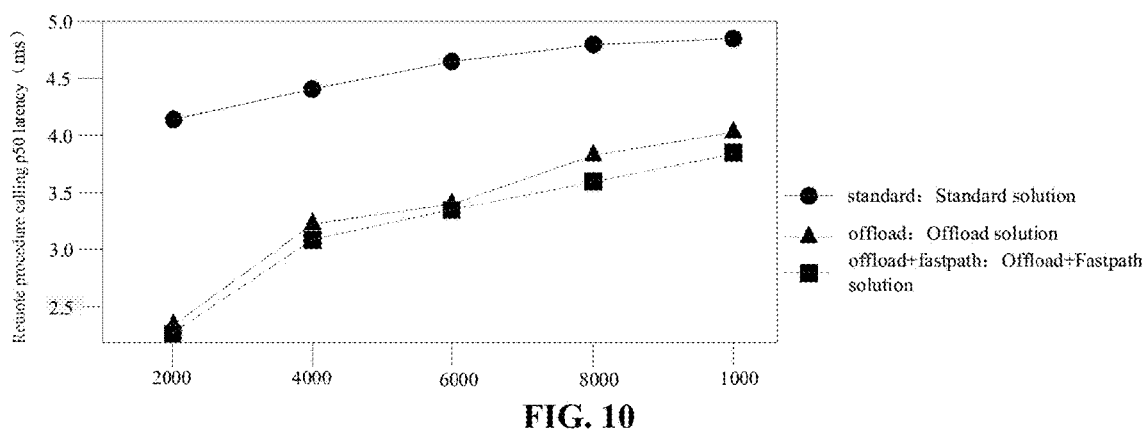
FIG. 9 illustrates a schematic diagram of a testing effect provided in an embodiment of the present disclosure.
FIG. 10 illustrates a time delay curve diagram provided in an embodiment of the present disclosure.

As shown in FIG. 9, it is a schematic diagram of a testing effect provided in the embodiments of the present disclosure. The testing service in FIG. 9 is the mesh.hrift.service, which is used to receive communication information to be processed, and the sending service (kitc_bench service) is used to send a request for carrying communication information to be processed. After passing through the mesh, the request reaches the testing service (i.e. mesh.example.hrift service), which can send the request to the service process of the mesh for processing. The remote procedure calling request (rpc request) is a request which carries the communication information to be processed. The remote procedure calling response (rpc response) refers to the response information provided by the mesh.example.hrift service after receiving the request. The remote procedure calling entry (rpc ingress), the remote procedure calling exit (rpc egress), and the mesh offload represent the solution of offloading the mesh to the DPU without using the "fast-slow separation" method. Fastpath optimization refers to the optimization solution of offloading the mesh to the DPU through fastpath and slowpath according to the information processing method provided in the embodiments of the present disclosure. CPU Usage represents the CPU usage rate. Hec represents DPU, Thrift CPU represents the CPU used by micro-services, and the usage rate of this CPU is represented by a solid line. The envoy CPU represents the CPU used by the mesh sidecar deployed in the same pod as the micro-services, and the usage rate of this CPU is represented by a dashed line. Envoy CPU (on Hec) represents the CPU used after offloading the mesh to Hec, and the usage rate of this CPU is represented by dotted lines. In FIG. 9, the usage of Thrift CPU, Envoy CPU, and Envoy CPU (on Hec) are identified using different colors and types of line segments. The standard solution shows that, for the related technology, mesh and micro-services are deployed in the same pod. The offload solution represents the solution of offloading mesh to the DPU without using "fast-slow separation". The (offload+fastpath) solution represents the optimization solution of offloading mesh to the DPU through fastpath and slowpath. In FIG. 9, the comparison diagrams of Thrift CPU usage, Envoy CPU usage, and Envoy CPU (on Hec) usage, corresponding to the standard solution, the offload solution, and offload+fastpath solution with QPS of 2000, 4000, 6000, 8000, and 10000 are shown, respectively.

As shown in FIG. 10, a time delay curve diagram is provided for an embodiment of the present disclosure, Latency represents time delay. FIG. 10 shows the standard solution, offload solution, and offload+fastpath solution corresponding to the long-range process calling p50 delay (i.e. rpc p50 Latency) in milliseconds (ms) with QPS is 2000, 4000, 6000, 8000, and 10000, respectively. Herein, FIG. 9 and FIG. 10 are both PoC results acquired through only the software. The standard solution uses solid lines with circles for identification, the offload solution uses dashed lines with triangles for identification, and the offload+fastpath solution uses dotted lines with squares for identification.

According to FIG. 9 and FIG. 10, it can be seen that after mesh offloading, the mesh no longer occupies the host CPU, and the overall CPU load (app+mesh) of the service is reduced by 25% to 33%. Moreover, the mesh process does not compete with the service process. Under the same QPS, the Thrift service itself reduces CPU usage by 9% to 16%. By using the user mode protocol stack in the mesh on Hec, the rpc p50Latency is reduced by 16% to 43%. After fastpath optimization, the CPU usage of the mesh process on Hec is further reduced by 38% to 50%. The rpc p50 Latency further decreased by 3% to 7%.

Person skilled in the art knows that, in the above methods of specific embodiments, the writing order of each step does not imply a strict execution order and any limitations on the implementation process. The specific execution order of each step should be determined according to its function and possible internal logic.

According to the same invention concept, embodiments of the present disclosure further provide an information processing apparatus corresponding to the information processing method. Because the principle of the apparatus in the embodiments of the present disclosure in solving the problem is similar to the above-mentioned information processing method, the implementation of the apparatus can refer to the implementation of the method, which is not be repeated.

Figures 11, 12:
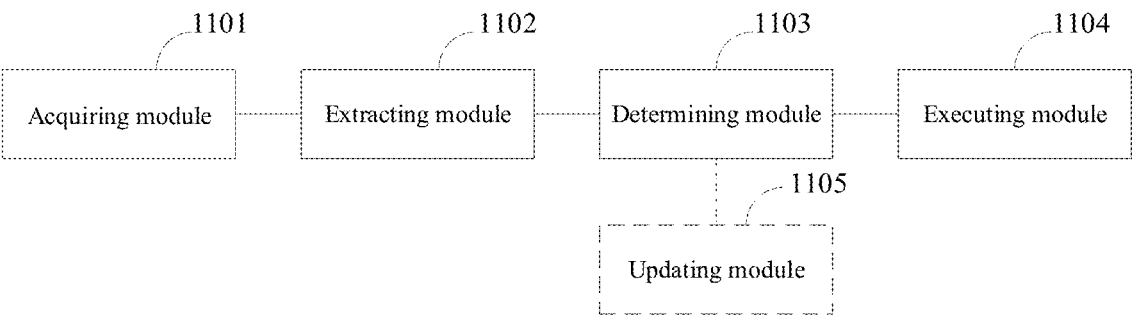
FIG. 11 illustrates a schematic diagram of an information processing apparatus provided in an embodiment of the present disclosure.
FIG. 12 illustrates a schematic diagram of a structure of a computer device provided in an embodiment of the present disclosure.

As shown in FIG. 11, it is a schematic diagram of an information processing apparatus provided in an embodiment of the present disclosure. The apparatus comprises:

an acquiring module 1101, configured for acquiring communication information to be processed. The communication information to be processed is generated by any one of micro-services deployed in a computing node;

an extracting module 1102, configured for extracting a key information character of the communication information to be processed by using a programmable hardware unit of a data processor;

a determining module 1103, configured for determining whether there is matching target processing operation information in a generated character mapping table according to the key information character, the character mapping table being generated by the programmable software unit of the data processor according to a historical key information character of historical communication information and its corresponding historical processing operation information; the target processing operation information including at least one micro-service processing operation;

an executing module 1104, configured for, if yes, executing a micro-service processing operation included in the target processing operation information for the communication information to be processed.

In one implementation, the micro-service processing operation comprises at least one verification processing operation with validation information. The target processing operation information further includes target verification information corresponding to the verification processing operation.

After executing the micro-service processing operation included in the target processing operation information, the executing module 1104 is further configured for:

forwarding the communication information to be processed, in a case where first operation results corresponding to various verification processing operations each match the target verification information corresponding to the verification processing operation.

In one possible implementation, the micro-service processing operation includes a load balancing processing operation. The target processing operation information further includes at least one resource cluster to be selected and a target load balancing algorithm corresponding to the load balancing processing operation. The resource cluster to be selected includes at least one resource container, and each resource container is deployed with a micro-service.

When executing the micro-service processing operation included in the target processing operation information, the executing module 1104 is configured for:

performing the load balancing operation on at least one resource cluster to be selected to acquire the target resource container by using the target load balancing algorithm;

and after acquiring the target resource container, it is further configured for:

forwarding the communication information to be processed to the target micro-service deployed in the target resource container, so that the target micro-service responds to the communication information to be processed;

In one possible implementation, the micro-service processing operation includes an information modification operation and/or a status recording operation;

The executing module 1104, when executing the micro-service processing operation included in the target processing operation information for the communication information to be processed, is configured for:

executing the information modification operation for the communication information to be processed to acquire the modified communication information to be processed; and/or, performing the state recording operation to acquire state recording information related to the communication information to be processed;

and after executing the micro-service processing operation included in the target processing operation information, it is further configured for:

forwarding the modified communication information to be processed and/or storing the status record information.

In one possible implementation, the apparatus further comprises:

updating module 1105, which is configured for: in a case where the target processing operation information is absent, acquiring preset configuration information that matches the key information character according to the key information character by using the programmable software unit;

according to the preset configuration information, determining and executing a target processing operation that matches the communication information to be processed from multiple preset processing operations;

according to the target processing operation and the key information character, updating the character mapping table.

In one possible implementation, in the case that the preset processing operation includes at least one preset verification processing operation, the updating module 1105, when determining and executing a target processing operation that matches the communication information to be processed from multiple preset processing operations, is configured for:

according to the preset configuration information, determining each target processing operation that need to be executed from each preset verification processing operation;

according to the key information character, acquiring preset verification information corresponding to each target processing operation; and, executing each target processing operation, and forwarding the communication information to be processed in a case where a second operation result of each target processing operation matches corresponding preset verification information.

The updating module 1105, when according to the target processing operation and the key information characters, updating the character mapping table, is configured for:

associating and storing the key information characters, each target processing operation, and the preset verification information corresponding to the target processing operation in the character mapping table.

In one possible implementation, in a case where the preset processing operation comprises a preset information routing operation and a preset load balancing processing operation, the update module 1105, when a target processing operation that matches the communication information to be processed from multiple preset processing operations, is configured for:

in response to the preset information routing operation and according to the key information character, acquiring at least one matching resource cluster that matches the key information character from each preset resource cluster comprised in the preset routing table, the preset resource cluster comprises at least one resource container, and each resource container is deployed with a micro-service;

in response to the preset load balancing processing operation, searching for a matching load balancing algorithm that matches the key information character, and determining a matching resource container from at least one matching resource cluster by using the matching load balancing algorithm;

taking the preset load balancing processing operation as the target processing operation, and forwarding the communication information to be processed to the micro-service deployed in the matching resource container.

the according to the target processing operation and the key information character, updating the character mapping table, comprises:

associating and storing the target processing operation, the matching load balancing algorithm, and the matching resource cluster in the character mapping table.

In one possible implementation, the extraction module 1102, when extracting key information character of the communication information to be processed by using the programmable hardware unit of the data processor, is configured for:

decoding and processing the communication information to be processed to acquire the decoded communication information to be processed by using the programmable hardware unit of the data processor;

extracting the key information character from the decoded communication information to be processed.

The executing module 1104, when forwarding the communication information to be processed to a target micro-service deployed in the target resource container, is configured for:

according to a preset communication protocol between micro-services, encoding the decoded communication information to be processed, and forwarding the encoded information to the target micro-service deployed in the target resource container.

The descriptions for the processing flow of each module in the apparatus and the interaction flow between modules can refer to the relevant description in the above-mentioned embodiments of the method, which will not be repeated here.

According to the same technical concept, the present embodiment further provides a computer device. Referring to FIG. 12, a schematic diagram of the structure of a computer device provided in the present embodiment includes:

A processor 1201, a memory 1202, and a bus 1203. Herein, the memory 1202 stores machine readable instructions that can be executed by the processor 1201. The processor 1201 is used to execute the machine-readable instructions stored on the memory 1202. When the machine readable instructions are executed by the processor 1201, the processor 1201 performs the following steps: S201: acquiring communication information to be processed, the communication information to be processed being generated by any one of micro-services deployed in a computing node; S202: extracting key information character of the communication information to be processed by using a programmable hardware unit of a data processor; S203: according to the key information character, determining whether there is matching target processing operation information in a generated character mapping table, wherein a character mapping table is generated by the programmable software unit of the data processor according to historical key information characters of historical communication information and their corresponding historical processing operation information, and the target processing operation information comprises at least one micro-service processing operation; and S204: if yes, executing the micro-service processing operation comprised in the target processing operation information for the communication information to be processed.

The above-mentioned memory 1202 includes an internal memory 1221 and an external memory 1222. The internal memory 1221 is used to temporarily store the operational data in the processor 1201 and the data exchanged with the external memory 1222 such as hard disks. The processor 1201 exchanges data with the external memory 1222 through the internal memory 1221. When the computer device runs, the processor 1201 communicates with the internal memory 1202 through the bus 1203, allowing the processor 1201 to execute the execution instructions mentioned in the above method embodiments.

The embodiments of the present disclosure further provide a computer-readable storage medium on which a computer program is stored. The computer program, when executed by the processor, achieves the steps of the information processing method described in the above method embodiment. Herein, the storage medium can be a volatile or non-volatile computer-readable storage medium.

The computer program product of the information processing method provided in the embodiments of the present disclosure includes a computer-readable storage medium that stores program codes. The instructions included in the program codes can be used to execute the steps of the information processing method described in the above method embodiment. Please refer to the above method embodiment for details, which will not be repeated here.

The computer program product can be specifically implemented through hardware, software, or a combination thereof. In one optional embodiment, the computer program product is specifically embodied as a computer storage medium, while in another optional embodiment, the computer program product is specifically embodied as a software product, such as a Software Development Kit (SDK), etc.

An ordinary person skilled in the field can clearly understand that, for the convenience and conciseness of the description, the specific working process of the system and apparatus described above can refer to the corresponding process in the aforementioned method embodiments, and will not be repeated here. In the several embodiments provided in the present disclosure, it should be understood that the disclosed systems, apparatus, and methods may be implemented in other ways. The apparatus embodiments described above are only illustrative. For example, the division of units is only a logical function division, and there may be other division methods in actual implementation. For example, multiple units or components can be combined or integrated into another system, or some features can be ignored or not executed. Another point is that the coupling or direct coupling or communication connection displayed or discussed between each other can be indirect coupling or communication connection through some communication interfaces, apparatuses or units, which can be in the form of electrical, mechanical or other forms.

The units described as separate components may be or may not be physically separated, and the components displayed as a unit may be or may not be a physical unit, that is, they may be located in one place or distributed across multiple network units. Some or all units can be selected according to actual needs to achieve the purpose of this embodiment.

In addition, in the various embodiments disclosed herein, each functional unit can be integrated into one processing unit, each unit can exist physically alone, or two or more units can be integrated into one unit.

If the function is implemented in the form of a software functional unit and sold or used as an independent product, it can be stored in a non-volatile computer-readable storage medium that can be executed by a processor. According to this understanding, the technical solution disclosed herein can essentially or in the form of a software product that contributes to the existing technology. The computer software product is stored in a storage medium and includes several instructions to enable a computer device (which can be a personal computer, server, or network device, etc.) to perform all or part of the steps of the methods described in the various embodiments disclosed herein. The aforementioned storage media include: USB flash drives, portable hard drives, Read Only Memory (ROM), Random Access Memory (RAM), disks or CDs, and other media that can store program code.

Finally, it should be noted that the above embodiments are only specific embodiments of the present disclosure, used to illustrate the technical solution disclosed herein, and not to limit it. The scope of protection of the present disclosure is not limited to this. Although detailed explanations of the present disclosure have been made with reference to the aforementioned embodiments, ordinary technical personnel in the art should understand that any technical personnel familiar with the art can still modify or easily think of changes to the technical solution recorded in the aforementioned embodiments within the scope of the disclosed technology, or replace some of the technical characters equally; and these modifications, changes, or replacements do not make the essence of the corresponding technical solution deviate from the spirit and scope of the technical solution disclosed in the present disclosure, and should be covered within the scope of protection of the present disclosure.

Thus, the scope of protection disclosed in the present disclosure shall be according to the scope of protection claimed in the claims.

The invention claimed is:

1. An information processing method, wherein the information processing method is applied to a data processor and comprising:

acquiring communication information to be processed, the acquired communication information to be processed being generated by any one of micro-services deployed in a computing node;

extracting key information character of the acquired communication information to be processed by using a programmable hardware unit of the data processor; and according to the extracted key information character, determining whether there is matching first processing operation information in a generated character mapping table, wherein the character mapping table is generated by a programmable software unit of the data processor according to historical key information characters of historical communication information and their corresponding historical processing operation information, and the matched first processing operation information comprises at least one micro-service processing operation;

if yes, executing the at least one micro-service processing operation comprised in the matched first processing operation information for the acquired communication information to be processed.

2. The method according to claim 1, wherein, the at least one micro-service processing operation comprises at least one verification processing operation with verification information, and the matched first processing operation information further comprises first verification information corresponding to the at lease one verification processing operation;

after executing the at least one micro-service processing operation comprised in the matched first processing operation information, the method further comprises:

forwarding the acquired communication information to be processed, in a case where first operation results corresponding to various verification processing operations each match the first verification information corresponding to the verification processing operation.

3. The method according to claim 2, wherein, the at least one micro-service processing operation comprises a load balancing processing operation; the matched first processing operation information further comprises at least one resource cluster to be selected and a first load balancing algorithm corresponding to the load balancing processing operation; the at least one resource cluster to be selected comprises at least one resource container, and each of the resource container is deployed with a micro-service;

executing the at least one micro-service processing operation comprised in the matched first processing operation information, comprises:

performing the load balancing operation on the at least one resource cluster to be selected to acquire a first resource container by using the first load balancing algorithm;

after acquiring the acquired first resource container, the method further comprises:

forwarding the acquired communication information to be processed to a first micro-service deployed in the acquired first resource container, so that the first micro-service responds to the acquired communication information to be processed.

4. The method according to claim 1, wherein, the at least one micro-service processing operation comprises a load balancing processing operation; the matched first processing operation information further comprises at least one resource cluster to be selected and a first load balancing algorithm corresponding to the load balancing processing operation; the at least one resource cluster to be selected comprises at least one resource container, and each of the resource container is deployed with a micro-service;

executing the at least one micro-service processing operation comprised in the matched first processing operation information, comprises:

performing the load balancing operation on the at least one resource cluster to be selected to acquire a first resource container by using the first load balancing algorithm;

after acquiring the first resource container, the method further comprises:

forwarding the acquired communication information to be processed to a first micro-service deployed in the acquired first resource container, so that the first micro-service responds to the acquired communication information to be processed.

5. The method according to claim 4, wherein the extracting key information character of the acquired communication information to be processed by using the programmable hardware unit of the data processor, comprises:

decoding and processing the acquired communication information to be processed to acquire the decoded communication information to be processed by using the programmable hardware unit of the data processor;

extracting the key information character from the decoded communication information to be processed;

the forwarding the acquired communication information to be processed to a first micro-service deployed in the acquired first resource container, comprises:

according to a preset communication protocol between micro-services, encoding the decoded communication information to be processed, and forwarding the encoded communication information to the first micro-service deployed in the acquired first resource container.

6. The method according to claim 1, wherein the at least one micro-service processing operation comprises at least one of an information modification operation and a status recording operation;

executing the at least one micro-service processing operation comprised in the matched first processing operation information for the acquired communication information to be processed, comprises:

executing the information modification operation for the acquired communication information to be processed to acquire modified communication information to be processed; and/or, performing the state recording operation for the acquired communication information to be processed to acquire state recording information related to the acquired communication information to be processed;

after executing the at least one micro-service processing operation comprised in the matched first processing operation information, the method further comprises:

forwarding the modified communication information to be processed; and/or, storing the acquired state recording information.

7. The method according to claim 1, wherein the method further comprises:

in a case where the matched first processing operation information is absent, acquiring preset configuration information that matches the extracted key information character according to the extracted key information character by using the programmable software unit;

according to the acquired preset configuration information, determining and executing a first processing operation that matches the acquired communication information to be processed from multiple preset processing operations;

according to the executed first processing operation and the extracted key information character, updating the generated character mapping table.

8. The method according to claim 7, wherein, in a case where each preset processing operation comprises at least one preset verification processing operation, the determining and executing the first processing operation that matches the acquired communication information to be processed from the multiple preset processing operations according to the acquired preset configuration information, comprises:

according to the acquired preset configuration information, determining each of the first processing operation that need to be executed from each preset verification processing operation;

according to the extracted key information character, acquiring preset verification information corresponding to each of the first processing operation; and, executing each of the first processing operation, and forwarding the acquired communication information to be processed in a case where a second operation result of each of the first processing operation matches the corresponding acquired preset verification information;

the according to the executed first processing operation and the extracted key information characters, updating the generated character mapping table, comprises:

associating and storing the extracted key information character, each of the first processing operation, and the preset verification information corresponding to the acquired first processing operation in the generated character mapping table.

9. The method according to claim 7, wherein, in a case where the preset processing operation comprises a preset information routing operation and a preset load balancing processing operation, the determining and executing the first processing operation that matches the acquired communication information to be processed from the multiple preset processing operations, comprises:

in response to the preset information routing operation and according to the extracted key information character, acquiring at least one matching resource cluster that matches the extracted key information character from each preset resource cluster comprised in a preset routing table, the respective preset resource cluster comprises at least one resource container, and each of the resource container is deployed with a micro-service;

in response to the preset load balancing processing operation, searching for a matching load balancing algorithm that matches the extracted key information character, and determining a matching resource container from the at least one acquired matching resource cluster by using the matching load balancing algorithm;

taking the preset load balancing processing operation as the first processing operation, and forwarding the acquired communication information to be processed to the micro-service deployed in the determined matching resource container;

the according to the acquired first processing operation and the extracted key information character, updating the generated character mapping table, comprises:

associating and storing the acquired first processing operation, the matching load balancing algorithm, and the at least one acquired matching resource cluster in the generated character mapping table.

10. The method according to claim 7, wherein, in a case where the preset processing operation comprises a preset information routing operation and a preset load balancing processing operation, the determining and executing the first processing operation that matches the acquired communication information to be processed from the multiple preset processing operations, comprises:

in response to the preset information routing operation and according to the extracted key information character, acquiring at least one matching resource cluster that matches the extracted key information character from each preset resource cluster comprised in a preset routing table, the respective preset resource cluster comprises at least one resource container, and each of the resource container is deployed with a micro-service;

in response to the preset load balancing processing operation, searching for a matching load balancing algorithm that matches the extracted key information character, and determining a matching resource container from the at least one acquired matching resource cluster by using the matching load balancing algorithm;

taking the preset load balancing processing operation as the acquired first processing operation, and forwarding the acquired communication information to be processed to the micro-service deployed in the determined matching resource container;

the according to the acquired first processing operation and the extracted key information character, updating the generated character mapping table, comprises:

associating and storing the acquired first processing operation, the matching load balancing algorithm, and the at least one acquired matching resource cluster in the generated character mapping table.

11. A computer device, comprising:

a processor, and a memory, wherein the memory stores machine readable instructions that is executed by the processor, the processor is used to execute the machine-readable instructions stored on the memory, and wherein in a case where the machine-readable instructions are executed by the processor, the processor executes an information processing method, and the information processing method comprises:

acquiring communication information to be processed, the acquired communication information to be processed being generated by any one of micro-services deployed in a computing node;

extracting key information character of the acquired communication information to be processed by using a programmable hardware unit of a data processor; and according to the extracted key information character, determining whether there is matching first processing operation information in a generated character mapping table, wherein the character mapping table is generated by a programmable software unit of the data processor according to historical key information characters of historical communication information and their corresponding historical processing operation information, and the matched first processing operation information comprises at least one micro-service processing operation;

if yes, executing the at least one micro-service processing operation comprised in the matched first processing operation information for the acquired communication information to be processed.

12. A non-transitory computer-readable storage medium, wherein a computer program is stored on the non-transitory computer-readable storage medium, in a case where the computer program is run by a computer device, the computer device executes an information processing method and the information processing method comprises:

acquiring communication information to be processed, the acquired communication information to be processed being generated by any one of micro-services deployed in a computing node;

extracting key information character of the acquired communication information to be processed by using a programmable hardware unit of a data processor; and according to the extracted key information character, determining whether there is matching first processing operation information in a generated character mapping table, wherein the character mapping table is generated by a programmable software unit of the data processor according to historical key information characters of historical communication information and their corresponding historical processing operation information, and the matched first processing operation information comprises at least one micro-service processing operation;

if yes, executing the at least one micro-service processing operation comprised in the matched first processing operation information for the acquired communication information to be processed.

* * * * *